United States Patent
Wang et al.

(10) Patent No.: US 12,216,368 B2
(45) Date of Patent: Feb. 4, 2025

(54) DISPLAY PANEL AND DISPLAY DEVICE

(71) Applicants: Hefei BOE Optoelectronics Technology Co., Ltd., Anhui (CN); BOE TECHNOLOGY GROUP CO., LTD., Beijing (CN)

(72) Inventors: Hui Wang, Beijing (CN); Yuqi Liu, Beijing (CN); Qianqian Zhang, Beijing (CN); Yanni Liu, Beijing (CN); Yijun Wang, Beijing (CN); Sheng Wang, Beijing (CN); Junsheng Chen, Beijing (CN)

(73) Assignees: Hefei BOE Optoelectronics Technology Co., Ltd., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/272,343

(22) PCT Filed: Nov. 29, 2021

(86) PCT No.: PCT/CN2021/133896
§ 371 (c)(1),
(2) Date: Jul. 13, 2023

(87) PCT Pub. No.: WO2023/092536
PCT Pub. Date: Jun. 1, 2023

(65) Prior Publication Data
US 2024/0077771 A1 Mar. 7, 2024

(51) Int. Cl.
*G02F 1/1347* (2006.01)
*G02F 1/1335* (2006.01)
(Continued)

(52) U.S. Cl.
CPC ...... *G02F 1/1347* (2013.01); *G02F 1/133512* (2013.01); *G02F 1/133531* (2021.01); *G02F 1/133606* (2013.01); *G02F 1/136286* (2013.01)

(58) Field of Classification Search
CPC ............ G02F 1/1347; G02F 1/133512; G02F 1/133531; G02F 1/133606; G02F 1/136286; G02F 1/1339; G02F 1/134309
See application file for complete search history.

(56) References Cited

U.S. PATENT DOCUMENTS

2005/0162596 A1* 7/2005 Kim ...................... G02F 1/1343
349/134
2007/0222915 A1 9/2007 Niioka et al.
(Continued)

FOREIGN PATENT DOCUMENTS

CN 102681180 A 9/2012
CN 102692765 A 9/2012
(Continued)

*Primary Examiner* — Mariam Qureshi
(74) *Attorney, Agent, or Firm* — HOUTTEMAN LAW LLC

(57) ABSTRACT

The present disclosure provides a display panel, including: a first panel and a second panel opposite to the first panel; the first panel includes: gate lines extending along a first direction and data lines extending along a second direction, and the gate lines and the data lines intersect to define pixel regions; the second panel includes: a plurality of support column periodic units arranged in an array along the first direction and the second direction, each support column periodic unit includes a plurality of support columns, and at least a part of the support columns each satisfy: a connection line between the support column and a support column closest thereto extends along a third direction, and an
(Continued)

included angle between the third direction and the first direction is not equal to 0°. The present disclosure further provides a display device.

16 Claims, 15 Drawing Sheets

(51) Int. Cl.
*G02F 1/13357* (2006.01)
*G02F 1/1362* (2006.01)

(56) References Cited

U.S. PATENT DOCUMENTS

2013/0235294 A1* 9/2013 Nomura ............... G02F 1/13394
　　　　　　　　　　　　　　　　　　　438/30
2015/0362741 A1* 12/2015 Oh ...................... G02F 1/13394
　　　　　　　　　　　　　　　　　　　349/15
2020/0326567 A1* 10/2020 Fang .................... G02F 1/1323

FOREIGN PATENT DOCUMENTS

| CN | 102749713 A | 10/2012 |
| CN | 104166277 A | 11/2014 |
| CN | 105739112 A | 7/2016 |
| CN | 107479257 A | 12/2017 |
| CN | 109491155 A | 3/2019 |
| CN | 111290056 A | 6/2020 |
| CN | 112711152 A | 4/2021 |
| JP | 2013092607 A | 5/2013 |

* cited by examiner

α=0°
(a)

α=0.1°
(b)

α=0.2°
(c)

α=0.5°
(d)

α=1°
(e)

α=2°
(f)

α=5°
(g)

α=7°
(h)

DISPLAY PANEL AND DISPLAY DEVICE

CROSS REFERENCE TO RELATED APPLICATION

This is a National Phase Application filed under 35 U.S.C. 371 as a national stage of PCT/CN2021/133896, filed on Nov. 29, 2021, the contents of which are incorporated herein by reference in their entirety.

TECHNICAL FIELD

The present disclosure relates to the field of display, and in particular, to a display panel and a display device.

BACKGROUND

With the development of science and technology, people have higher requirements on display effects of Liquid Crystal Displays (LCDs). At present, some high-end LCDs adopt a stacked structure of two liquid crystal panels to endow display devices with an anti-peep function, in which case the display devices can be switched between an anti-peep mode and a sharing mode.

SUMMARY

In a first aspect, embodiments of the present disclosure provide a display panel, including: a first panel and a second panel opposite to the first panel;
  wherein the first panel includes: gate lines extending along a first direction and data lines extending along a second direction, and the gate lines and the data lines intersect to define pixel regions; and
  the second panel includes: a plurality of support column periodic units arranged in an array along the first direction and the second direction, each of the plurality of support column periodic units includes a plurality of support columns, and at least a part of the support columns each satisfy: a connection line between the support column and a support column closest thereto extends along a third direction, and an included angle between the third direction and the first direction is not equal to 0°.

In some embodiments, the included angle between the third direction and the first direction is greater than or equal to 7°.

In some embodiments, the first panel further includes: a black matrix including a plurality of first light-shielding strips extending along the first direction and a plurality of second light-shielding strips extending along the second direction;
  the plurality of first light-shielding strips cover areas where the gate lines are located, and the plurality of second light-shielding strips cover areas where the data lines are located; and
  a width, at intersections with the data lines, of the black matrix along an extending direction of the gate lines is greater than a width of the black matrix between two adjacent pixel regions in an extending direction of the data lines.

In some embodiments, a plurality of support columns in the second panel form a plurality of support column groups, and each of the plurality of support column groups includes a plurality of support columns arranged along the third direction, and each of the plurality of support columns in the support column group satisfies: a connection line between the support column and a support column closest thereto extends along the third direction.

In some embodiments, the plurality of support columns in each of the plurality of support column periodic units include: at least one main support column and a plurality of auxiliary support columns; and a ratio of the number of the at least one main support columns to the number of the plurality of auxiliary support columns in each of the plurality of support column periodic units is in the range of 1:50 to 1:10.

In some embodiments, the display panel is divided into a plurality of periodic regions arranged in an array along the first direction and the second direction, the plurality of periodic regions are in one-to-one correspondence with the plurality of support column periodic units, each of the plurality of support column periodic units is in a corresponding periodic region, and the plurality of periodic regions are rectangular in shape;
  each of the plurality of support column periodic units includes at least four main support columns, and four main support columns of the at least four main support columns are at four vertices of the corresponding periodic region respectively; and
  four adjacent periodic regions arranged in a 2×2 array share one main support column at a common vertex thereof.

In some embodiments, a distance between two main support columns adjacent to each other in the first direction is greater than 500 μm; and
  a distance between two main support columns adjacent to each other in the second direction is greater than 1000 μm.

In some embodiments, support columns other than the four main support columns at the four vertices of the corresponding periodic region in each of the plurality of support column periodic units are divided into a plurality of support column sub-groups; and
  each of the plurality of support column sub-groups includes a plurality of support columns arranged along the third direction, and each of the plurality of support columns in the support column sub-group satisfies: a connection line between the support column and a column closest thereto extends along the third direction.

In some embodiments, the support columns other than the four main support columns at the four vertices of the corresponding periodic region in each of the plurality of support column periodic units include: one main support column and seventy-seven auxiliary support columns.

In some embodiments, the four main support columns at the four vertices of the corresponding periodic region in each of the plurality of support column periodic units are: a first main support column, a second main support column adjacent to the first main support column in the first direction, a third main support column adjacent to the second main support column in the second direction, and a fourth main support column adjacent to the third main support column in the first direction;
  the support columns other than the four main support columns at the four vertices of the corresponding periodic region in each of the plurality of support column periodic units are divided into six support column sub-groups, which are a first support column sub-group, a second support column sub-group, a third support column sub-group, a fourth support column sub-group, a fifth support column sub-group, and a sixth support column sub-group, respectively;

a connection line defined by any two support columns in the first support column sub-group passes through a point at one half of a line segment defined by the first main support column and the second main support column close to the second main support column;

a connection line defined by any two support columns in the second support column sub-group passes through a point at the other half of the line segment defined by the first main support column and the second main support column close to the first main support column;

a connection line defined by any two support columns in the third support column sub-group passes through the first main support column;

a connection line defined by any two support columns in the fourth support column sub-group passes through the third main support column;

a connection line defined by any two support columns in the fifth support column sub-group passes through a point at one half of a line segment defined by the third main support column and the fourth main support column close to the third main support column; and a connection line defined by any two support columns in the sixth support column sub-group passes through a point at the other half of the line segment defined by the third main support column and the fourth main support column close to the fourth main support column.

In some embodiments, the first support column sub-group includes seven auxiliary support columns, and one of the seven auxiliary support columns is at a trisection point of the line segment defined by the first main support column and the second main support column close to the second main support column;

the second support column sub-group includes fourteen auxiliary support columns, one of the fourteen auxiliary support columns is at a trisection point of the line segment defined by the first main support column and the second main support column close to the first main support column, and one of the fourteen auxiliary support columns is close to a midpoint of the line segment defined by the second main support column and the third main support column;

the third support column sub-group includes seventeen auxiliary support columns and one fifth main support column, and one positioning area and ten of the seventeen auxiliary support columns are sequentially arranged along the third direction and along a direction departing from the fifth main support column toward the first main support column;

the fourth support column sub-group includes eighteen auxiliary support columns, and one positioning area is between the fourth support column sub-group and the third main support column;

the fifth support column sub-group includes fourteen auxiliary support columns, and one of the fourteen auxiliary support columns is at a trisection point of the line segment defined by the third main support column and the fourth main support column close to the third main support column, and one of the fourteen auxiliary support columns is close to a midpoint of the line segment defined by the first main support column and the fourth main support column; and the sixth support column sub-group includes seven auxiliary support columns, and one of the seven auxiliary support columns is at a trisection point of the line segment defined by the third main support column and the fourth main support column close to the fourth main support column.

In some embodiments, the main support column is provided with at least one corresponding positioning area, and each of the at least one positioning area is adjacent to the corresponding main support column in the third direction.

In some embodiments, the main support column is provided with only one corresponding positioning area, and
the second panel includes a first auxiliary support column, a main support column, a positioning area corresponding to the main support column, and a second auxiliary support column arranged along the third direction in sequence, a first preset distance is provided between the main support column and the first auxiliary support column, a second preset distance is provided between the main support column and the second auxiliary support column, and the first preset distance is smaller than the second preset distance.

In some embodiments, a ratio of the first preset distance to the second preset distance ranges from 1:5 to 4:5.

In some embodiments, the second panel includes the main support column and a third auxiliary support column adjacent to each other along a direction perpendicular to the third direction, and a third preset distance is provided between the main support column and the third auxiliary support column; and
the third preset distance is larger than the second preset distance.

In some embodiments, the first preset distance ranges from 40 μm to 70 μm;
the second preset distance ranges from 80 μm to 120 μm; and
the third preset distance ranges from 130 μm to 170 μm.

In some embodiments, the first panel includes a plurality of pixel regions each including a transistor and a pixel electrode, the pixel electrode includes a plurality of first branch electrodes extending along a fourth direction and a plurality of second branch electrodes extending along a fifth direction, and the plurality of first branch electrodes are connected to the plurality of second branch electrodes;
the transistor has a gate electrode connected to a corresponding gate line, a source electrode connected to a corresponding data line, and a drain electrode connected to a corresponding pixel electrode; and
each of the data lines includes a first portion and a second portion alternately arranged, the first portion is connected to the second portion, the first portion extends along the fourth direction, the second portion extends along the fifth direction, the first portion and the first branch electrodes are arranged along the first direction, and the second portion and the second branch electrodes are arranged along the first direction.

In some embodiments, in a direction perpendicular to the second panel, a part of main support columns in the second panel overlap the plurality of first branch electrodes in the first display panel;
and/or, in the direction perpendicular to the second panel, a part of the main support columns in the second panel overlap the plurality of second branch electrodes in the first display panel;
and/or, in the direction perpendicular to the second panel, a part of the main support columns in the second panel overlap the data lines in the first display panel;
and/or, in the direction perpendicular to the second panel, a part of the main support columns in the second panel at least partially overlap the gate lines in the first display panel;

and/or, in the direction perpendicular to the second panel, a part of the auxiliary support columns in the second panel overlap the plurality of first branch electrodes in the first display panel;

and/or, in the direction perpendicular to the second panel, a part of the auxiliary support columns in the second panel overlap the plurality of second branch electrodes in the first display panel;

and/or, in the direction perpendicular to the second panel, a part of the auxiliary support columns in the second panel overlap the data lines in the first display panel;

and/or, in the direction perpendicular to the second panel, a part of the auxiliary support columns in the second panel overlap the gate lines in the first display panel;

and/or, in the direction perpendicular to the second panel, a part of the auxiliary support columns in the second panel overlap transistors in the first display panel.

In some embodiments, along the first direction, two adjacent auxiliary support columns are separated by at least two adjacent pixel regions.

In some embodiments, a plurality of support columns in the second panel form a plurality of support column groups each including first support column sub-groups and second support column sub-groups alternately arranged along the first direction;

- each of the first support column sub-groups includes a plurality of support columns arranged along the third direction, and each of the plurality of support columns in the first support column sub-group satisfies: a connection line between the support column and a support column closest thereto extends along the third direction;
- each of the second support column sub-groups includes a plurality of support columns arranged along a sixth direction, and each of the plurality of support columns in the second support column sub-group satisfies: a connection line between the support column and a support column closest thereto is along the sixth direction; and
- an included angle between the sixth direction and the third direction is not equal to 0°, and an included angle between the sixth direction and the first direction is equal to the included angle between the third direction and the first direction.

In some embodiments, the second panel includes a first base substrate and a second base substrate opposite to each other, and further includes a first electrode on the first base substrate, and a second electrode on a side of the second base substrate facing the first base substrate.

In some embodiments, a first polarizer is on a side of the second panel away from the first panel, a second polarizer is on the side of the second panel facing the first panel, and a polarization direction of the first polarizer is the same as a polarization direction of the second polarizer.

In some embodiments, a third polarizer is on a side of the first panel facing the second panel, a fourth polarizer is on a side of the first panel away from the second panel, and the third polarizer and the second polarizer are a same polarizer; and

- a polarization direction of the fourth polarizer is perpendicular to the polarization direction of the first polarizer.

In a second aspect, the embodiments of the present disclosure further provide a display device, including: a backlight module and the display panel provided in the first aspect, wherein both the first panel and the second panel in the display panel are on a light emission side of the backlight module.

DETAIL DESCRIPTION OF EMBODIMENTS

In order to enable those of ordinary skill in the art to better understand the technical solutions of the present disclosure, a display panel and a display device provided by the present disclosure are described in detail below with reference to the accompanying drawings.

Figure 1:
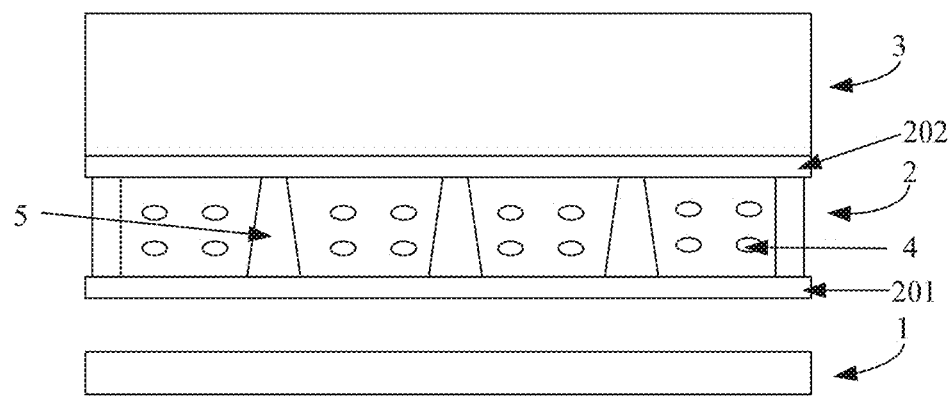
FIG. 1 is a schematic structural diagram of a display device with an anti-peep function according to the present disclosure.

FIG. 1 is a schematic structural diagram of a display device with an anti-peep function according to the present disclosure. As shown in FIG. 1, the display device with the anti-peep function includes two panels 2 and 3 stacked on top of each other. One panel 3 is configured to perform image display, and the other panel 2 is configured to perform light adjustment to adjust a viewing angle of the display device.

A case where both the panel 3 configured to perform image display and the panel 2 configured to perform light adjustment are liquid crystal panels is taken as an example. Apparently, in some scenarios, the panel 3 configured to perform image display may be an organic light-emitting diode display panel or a micro light-emitting diode (micro-LED) display panel.

With reference to FIG. 1, the liquid crystal panel 3 for display and the liquid crystal panel 2 for light adjustment are both located on a light emission side of a backlight module 1, and the liquid crystal panel 3 for display is located on a side of the liquid crystal panel 2 for light adjustment away from the backlight module. It should be noted that the backlight module in the present disclosure may be a collimated backlight system, or it may be the case that an anti-peep film is provided on a light emission surface of the backlight module and the anti-peep film is provided with a grating structure arranged in an array, which is not limited herein. The liquid crystal panel 3 for display is capable of displaying images; and the liquid crystal panel 2 for light adjustment includes a first base substrate 201, a second base substrate 202, and a first electrode (not shown), a second electrode (not shown), and a liquid crystal layer 4 which are located between the first base substrate 201 and the second base substrate 202, and support columns 5 are further disposed between the first base substrate 201 and the second base substrate 202 to play a supporting role. By controlling a voltage difference ΔV between voltages applied to the first electrode and the second electrode, the display device is controlled to operate in an anti-peep mode or a sharing mode, which will be described in detail below.

Figure 2:
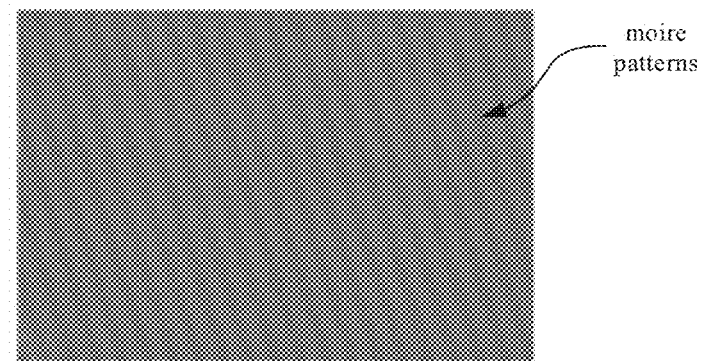
FIG. 2 is a schematic diagram showing occurrence of obvious moire patterns in a display device.

FIG. 2 is a schematic diagram showing occurrence of obvious moire patterns in the display device. As shown in FIG. 2, it is found in practical applications that when the liquid crystal panel 3 for display and the liquid crystal panel 2 for light adjustment are stacked for use, a pattern of an internal structure of the liquid crystal panel 3 for display and a pattern of an internal structure of the liquid crystal panel 2 for light adjustment interfere with each other, thus generating relatively obvious moire patterns.

Figure 3:
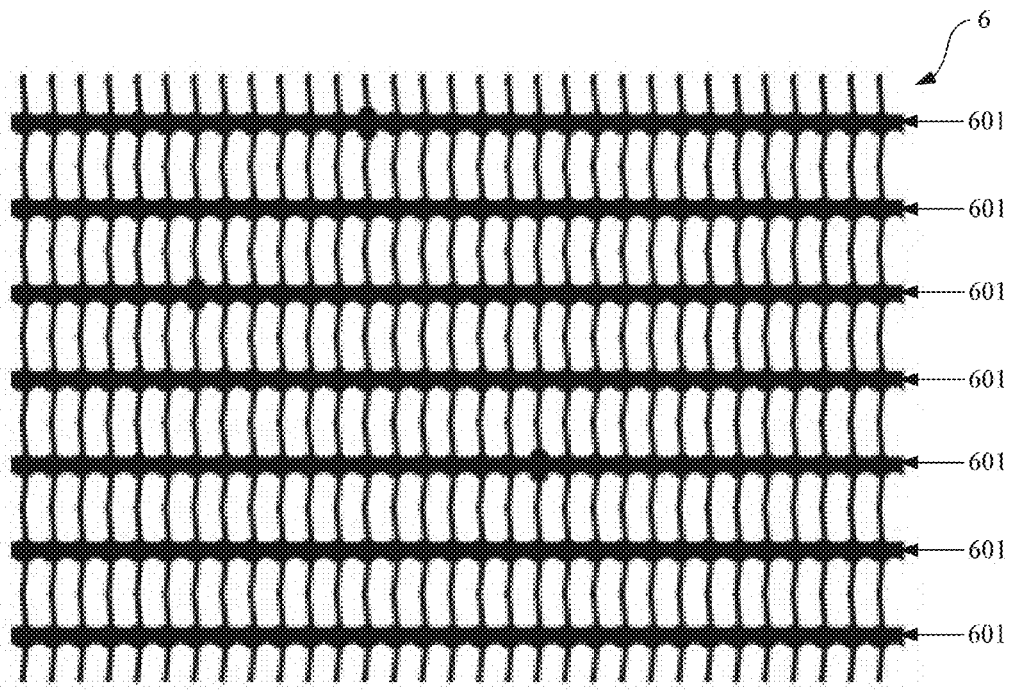
FIG. 3 is a schematic diagram of a black matrix in a liquid crystal panel for display.
Figure 4:
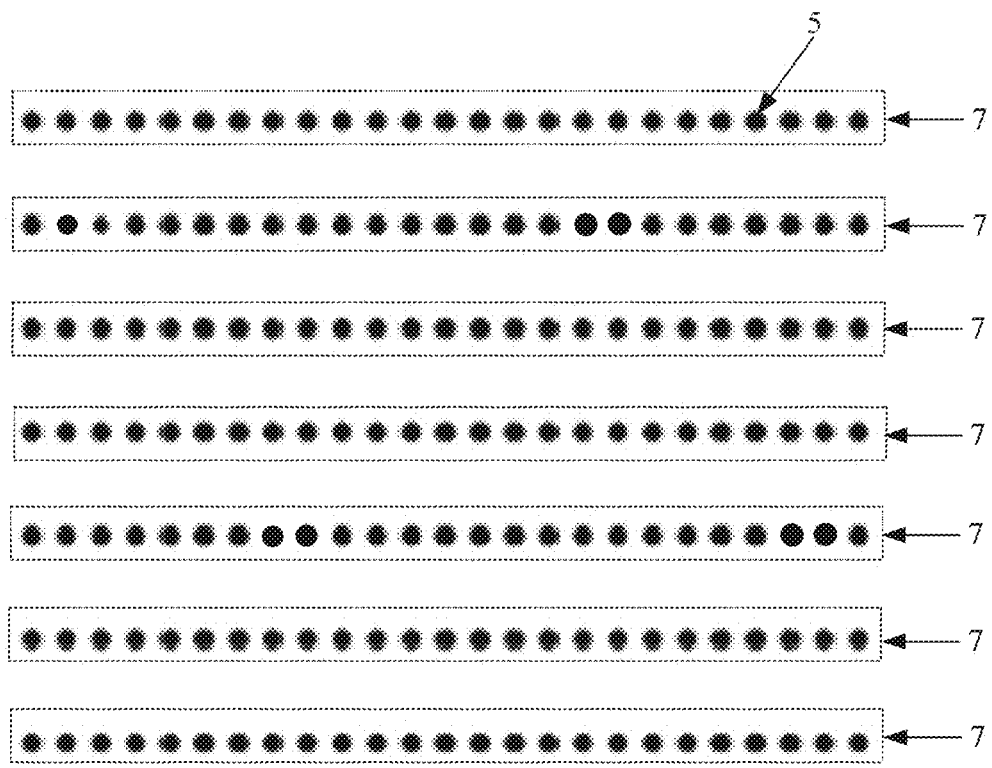
FIG. 4 is a schematic diagram of support columns in a liquid crystal panel for light adjustment.

FIG. 3 is a schematic diagram of a black matrix in the liquid crystal panel for display, and FIG. 4 is a schematic diagram of the support columns in the liquid crystal panel for light adjustment. As shown in FIGS. 3 and 4, it is found by research that the obvious moire patterns occurring in the display device are formed due to interference between a pattern of the black matrix 6 in the liquid crystal panel 3 for display and patterns of the support columns 5 in the liquid crystal panel 2 for light adjustment. Specifically, the pattern of the black matrix 6 includes first light-shielding strips 601 extending along a row direction and configured to shield gate lines, and the first light-shielding strips 601 are sequentially arranged in a column direction. The support columns 5 in the liquid crystal panel 2 for light adjustment are arranged in an array in the row direction and the column direction, and a distance between two support columns 5 adjacent to each other in the row direction is smaller than that between two support columns 5 adjacent to each other in the column direction, in this case, it may be regarded as that the liquid crystal panel 2 for light adjustment includes a plurality of support column groups 7 each including a plurality of support columns 5 sequentially arranged along the row direction, and the plurality of support column groups 7 are sequentially arranged in the column direction. Since the distance between adjacent support columns 5 in the support column group 7 is relatively small, each support column group 7 may be perceived by a user as a strip pattern extending along the row direction.

The first light-shielding strips 601 are periodically arranged in the column direction, the support column groups 7 are also periodically arranged in the column direction, and a spatial frequency of the first light-shielding strips 601 is slightly different from that of the support column groups 7. In this case, patterns of the first light-shielding strips 601 and patterns of the support column groups 7 may form a beat due to the slight difference between the spatial frequencies, resulting in the generation of the obvious moire patterns. It should be noted that the spatial frequency of a certain structure described herein refers to the number of occurrences of the structure in a unit area.

To alleviate or even completely solve the above problem of the moire patterns, the present disclosure provides a corresponding solution, which will be described in detail below with reference to specific embodiments.

Figure 5:
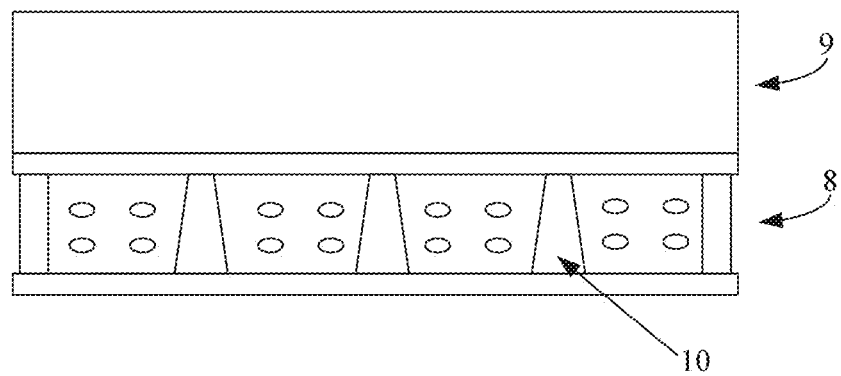
FIG. 5 is a schematic structural diagram of a display panel according to the embodiments of the present disclosure.
Figure 6:
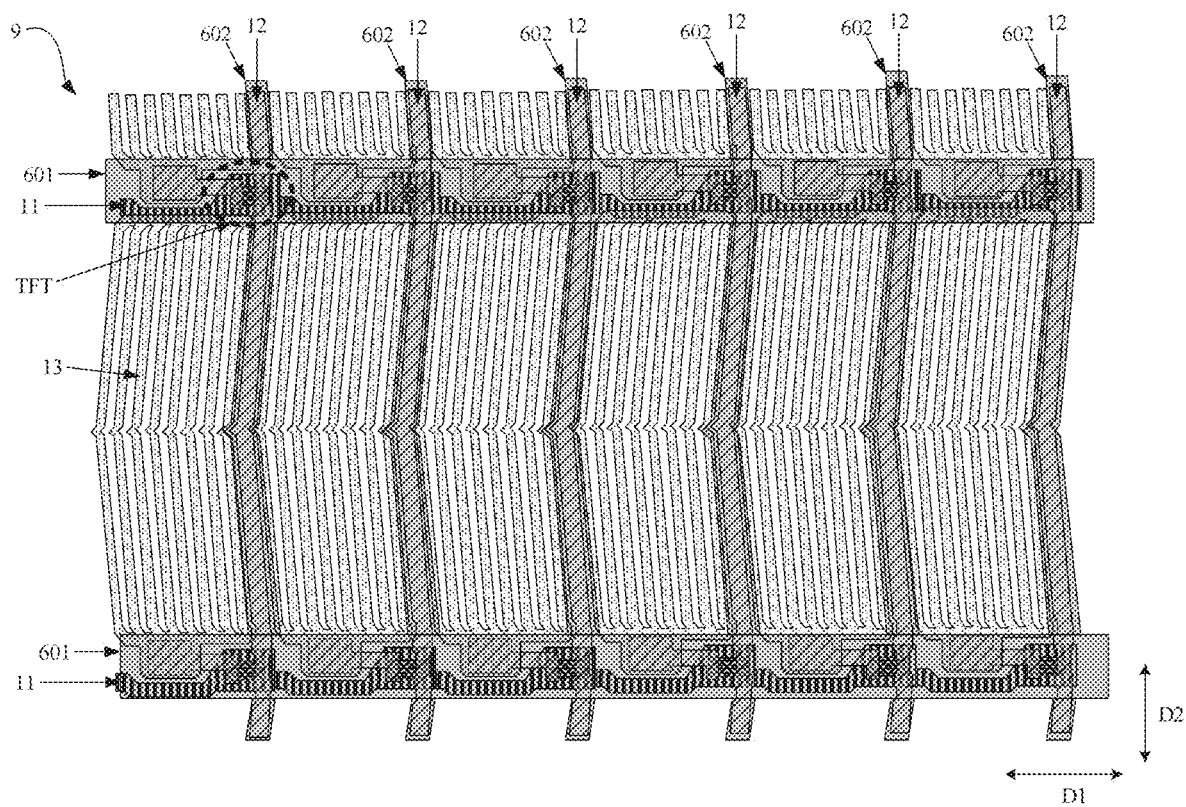
FIG. 6 is a top view of a partial region of a first panel according to the embodiments of the present disclosure.
Figure 7A:
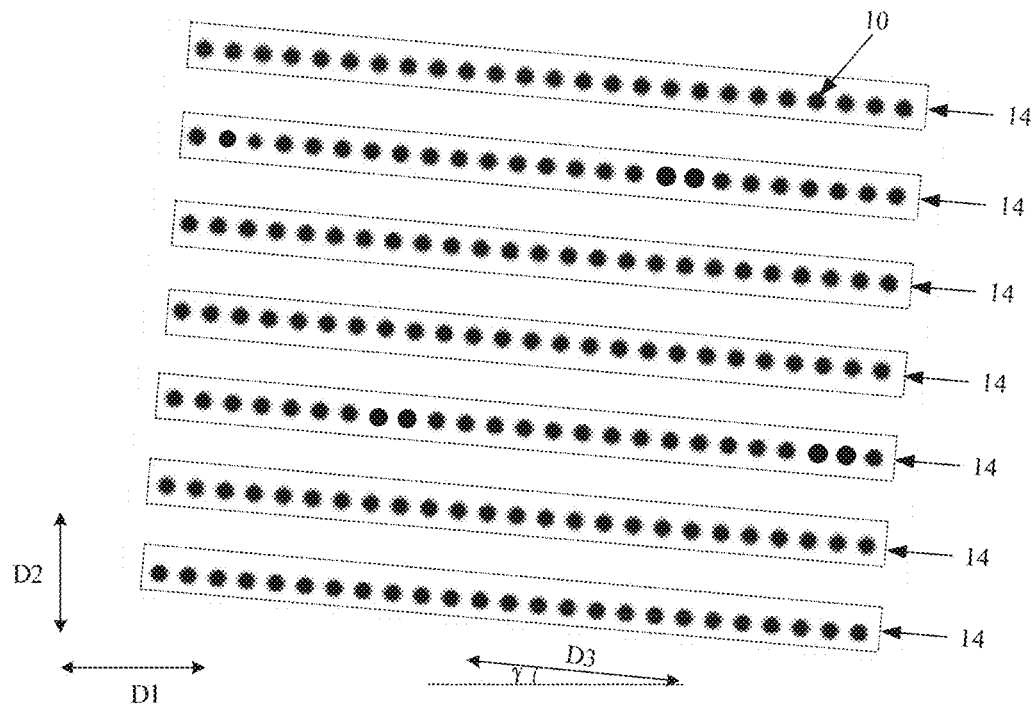
FIG. 7a is a top view of a partial region of a second panel according to the embodiments of the present disclosure.
Figure 7B:
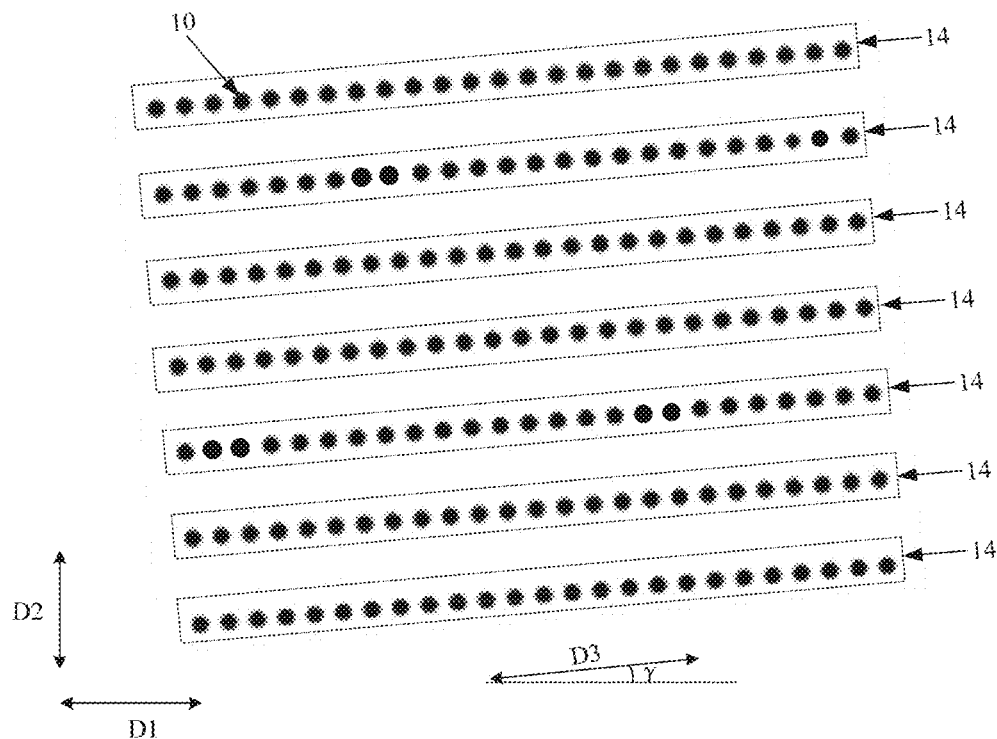
FIG. 7b is a top views of a partial region of a second panel according to the embodiments of the present disclosure.

FIG. 5 is a schematic structural diagram of a display panel according to the embodiments of the present disclosure, FIG. 6 is a top view of a partial region of a first panel according to the embodiments of the present disclosure, FIG. 7a is a top view of a partial region of a second panel according to the embodiments of the present disclosure, and FIG. 7b is another top view of a partial region of a second panel according to the embodiments of the present disclosure. As shown in FIGS. 5 to 7b, the display panel includes: a first panel 9 and a second panel 8 disposed opposite to the first panel 9; the first panel 9 includes: gate lines 11 extending along a first direction D1 and data lines 12 extending along a second direction D2, and the gate lines 11 and the data lines 12 intersect to define pixel regions; the second panel 8 includes: a plurality of support column periodic units arranged in an array along the first direction D1 and the second direction D2, each support column periodic unit includes a plurality of support columns 10, and at least a part of the support columns 10 each satisfy: a connection line between the support column 10 and the support column 10 closest thereto extends along a third direction D3, and an included angle γ between the third direction D3 and the first direction D1 is not equal to 0°.

It should be noted that, in the embodiments of the present disclosure, the connection line between two support columns may refer to a connection line between centers of the two support columns, or a connection line between edges of the two support columns on a same side. The case where the connection line between the two support columns is the connection line between the centers of the two support columns is taken as an example in the following description.

In addition, the center of the support column in the present disclosure refers to a center of a cross section of the support column parallel to the second panel.

The first panel 9 further includes a black matrix completely covering the gate lines 11 and the data lines 12. The black matrix includes first light-shielding strips 601 for shielding the gate lines 11 and second light-shielding strips 602 for shielding the data lines 12, and a width of the first light-shielding strips 601 in the second direction D2 is larger than that of the second light-shielding strips 602 in the first direction D1.

In general, since the width of the second light-shielding strips 602 is relatively small and a spatial frequency of the second light-shielding strips is significantly different from that of the support columns, it is difficult to form a beat between the second light-shielding strips 602 and the support columns.

In the embodiments of the present disclosure, a material of the support columns includes: a polymeric organic compound material such as acrylic or polyimide. In an embodiment, the material of the support columns is a light-transmissive material, which can increase transmittance of a backlight.

It should be noted that the display panel provided in the embodiments of the present disclosure is a display panel having an anti-peep function, and the display panel can be switched between the anti-peep mode and the sharing mode. In the embodiments of the present disclosure, the first panel 9 is a liquid crystal panel for display, and the second panel 8 is a display panel for light adjustment.

In addition, a case where the first direction D1 refers to row directions in FIGS. 6, 7a, and 7b and the second direction D2 refers to column directions in FIGS. 6, 7a, and 7b is only for illustration, rather than limiting the technical solutions of the present disclosure.

In the embodiments of the present disclosure, all the support column periodic units have the same arrangement and structure of support columns, so when the second panel 8 is fabricated and the support columns thereon need to be monitored, only one of the support column periodic units on the second panel 8 needs to be selected for monitoring (since the support columns are periodically arranged, only one minimum periodic unit needs to be sampled and monitored in a production process). In such case, the monitoring can be automatically carried out by a machine (only in a case where the patterns of the support columns are periodical, the patterns of the support columns can be recognized by a cameral of a monitoring device and selecting one minimum cycle periodic for monitoring is feasible).

Meanwhile, unlike a case where a connection line between each support column and the support column closest thereto in the existing display panel for light adjustment extends along the first direction D1 (i.e., as shown in FIG. 4), in the embodiments of the present disclosure, positions of the support columns 10 in the existing display panel for light adjustment are such adjusted that at least a part of the support columns 10 each satisfy: the connecting line between the support column 10 and the support column closest thereto extends along the third direction D3 and an included angle γ between the third direction D3 and the first direction D1 is not equal to 0°, and in this way, a beat effect between the patterns of the support columns 10 and the patterns of the first light-shielding strips 601 is reduced, which may alleviate the moire patterns to a certain extent.

In some embodiments, the plurality of support columns 10 in the second panel 8 form a plurality of support column groups 14, each of the plurality of support column groups 14 includes a plurality of support columns 10 arranged along the third direction D3, and each support column 10 in each support column group 14 satisfies: a connection line between the support column 10 and the support column 10 closest thereto extends along the third direction D3.

Figure 8:
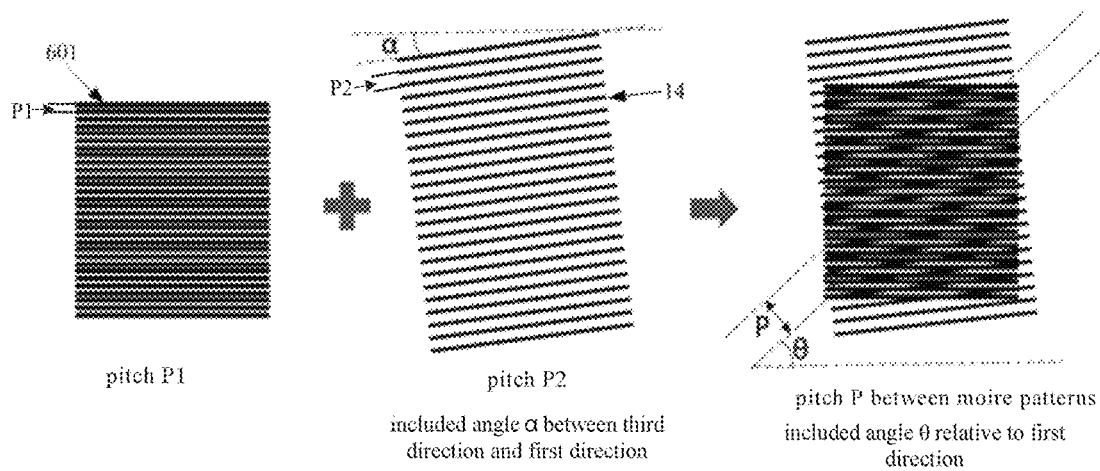
FIG. 8 is a top view of a plurality of first light-shielding strips in a first panel and a plurality of support column groups in a second panel when stacked together according to the embodiments of the present disclosure.

FIG. 8 is a top view of a plurality of first light-shielding strips in a first panel and a plurality of support column groups in a second panel when stacked together according to the embodiments of the present disclosure. As shown in FIG. 8, a first pitch P1 is provided between adjacent first light-shielding strips 601, a pitch P2 is provided between adjacent support column groups 14, and the included angle between the third direction D3 and the first direction D1 is α; in this case, taking no account of a distance between the first light-shielding strips 601 and the support column groups 14 in a direction perpendicular to the first panel 9, a pitch between moire patterns formed by the first light-shielding strips 601 and the support column groups 14 and viewed along the direction perpendicular to the first panel 9 is P, an included angle between an extending direction of the moire patterns and the first direction D1 is θ, and the formulae below can be deduced from geometrical relationships:

$$P = \frac{P1*P2}{\sqrt{(P1)^2 + (P2)^2 - 2*P1*P2*\cos\alpha}} \quad (1)$$

$$\cos\theta = \frac{P1*\cos\alpha - P2}{\sqrt{(P1)^2 + (P2)^2 - 2*P1*P2*\cos\alpha}} \quad (2)$$

$$\sin\theta = \frac{P1*\sin\alpha}{\sqrt{(P1)^2 + (P2)^2 - 2*P1*P2*\cos\alpha}} \quad (3)$$

Figure 9:
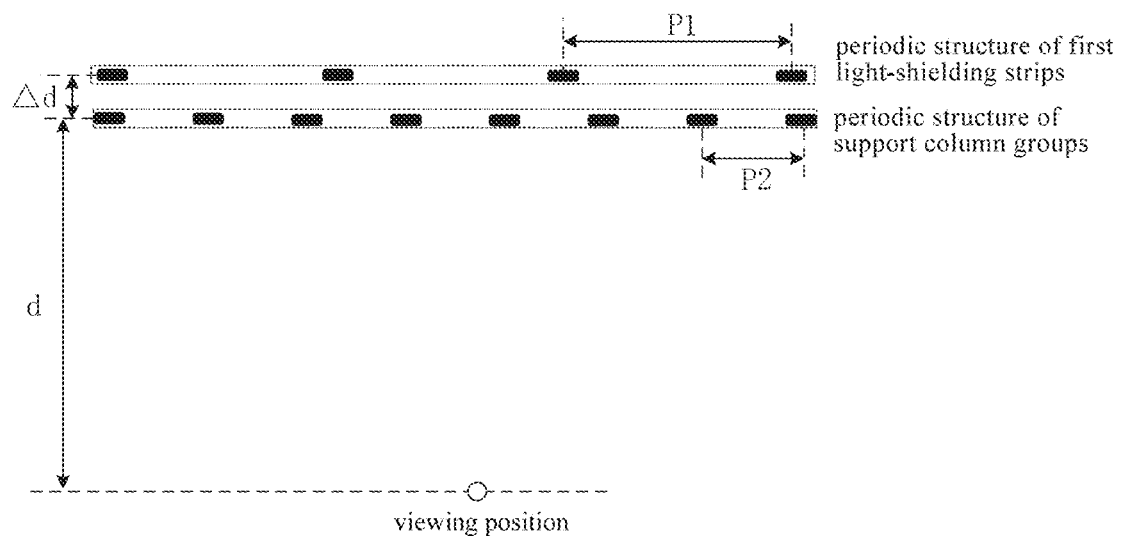
FIG. 9 is a schematic diagram of viewing moire patterns when a distance between first light-shielding strips and support column groups in a direction perpendicular to the first panel is considered.

FIG. 9 is a schematic diagram of viewing the moire patterns when the distance between the first light-shielding strips and the support column groups in the direction perpendicular to the first panel is taken into account. As shown in FIG. 9, in a case where a distance Δd between the first light-shielding strips 601 and the support column groups 14 in the direction perpendicular to the first panel 9 is taken into account and a viewing distance is d, according to the pitch P between adjacent moire patterns and the included angle θ obtained by viewing, the formulae below can be deduced from geometrical relationships:

$$P = \frac{P1*P2}{\sqrt{(P1)^2 + \left(\frac{d+\Delta d}{d}*P2\right)^2 - 2*P1*\left(\frac{d+\Delta d}{d}*P2\right)*\cos\alpha}} \quad (4)$$

$$\cos\theta = \frac{P1*\cos\alpha - \left(\frac{d+\Delta d}{d}*P2\right)}{\sqrt{(P1)^2 + \left(\frac{d+\Delta d}{d}*P2\right)^2 - 2*P1*\left(\frac{d+\Delta d}{d}*P2\right)*\cos\alpha}} \quad (5)$$

$$\sin\theta = \frac{P1*\sin\alpha}{\sqrt{(P1)^2 + \left(\frac{d+\Delta d}{d}*P2\right)^2 - 2*P1*\left(\frac{d+\Delta d}{d}*P2\right)*\cos\alpha}} \quad (6)$$

As can be seen from the above formulae (1) and (4), in a case where P1, P2, d, and Δd are fixed, the angle α is changed from α=0°, a value of P changes with the angle a to be subjected to a cosine change. When the value of P is reduced to a certain extent (generally less than 2 mm), the moire patterns generated due to the interference between the first light-shielding strips 601 and the support column groups 14 are not observable because the pitch P between adjacent moire patterns is too small, that is, a purpose of "eliminating" the moire patterns is achieved.

Figure 10:
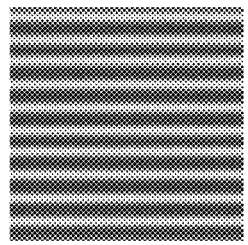
FIG. 10 shows effect diagrams when simulating that a takes different values according to the embodiments of the present disclosure.
Figure 10:
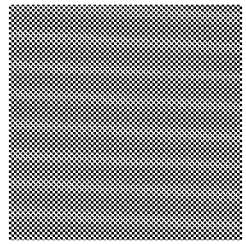
Figure 10:
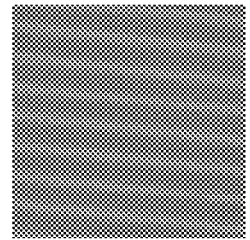
Figure 10:
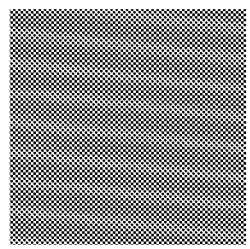
Figure 10:
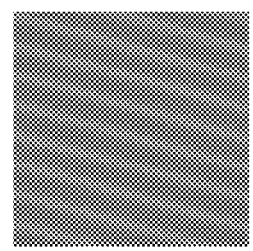
Figure 10:
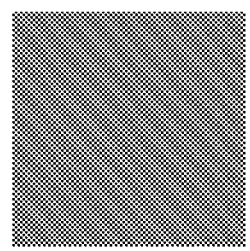
Figure 10:
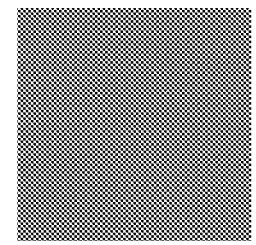
Figure 10:
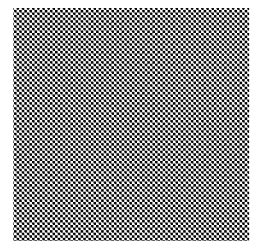

FIG. 10 shows effect diagrams when simulating that a takes different values according to the embodiments of the present disclosure. As shown in FIG. 10, (a) is an effect diagram when simulating $\alpha=0°$, and it is obtained by the simulation that P=5 mm and $\theta=0°$; (b) is an effect diagram when simulating $\alpha=0.1°$, and it is obtained by the simulation that P=7 mm and $\theta=177°$; (c) is an effect diagram when simulating $\alpha=0.2°$, and it is obtained by the simulation that P=6.5 mm and $\theta=174°$; (d) is an effect diagram when simulating $\alpha=0.5°$, and it is obtained by the simulation that P=6 mm and $\theta=165°$; (e) is an effect diagram when simulating $\alpha=1°$, and it is obtained by the simulation that P=6 mm and $\theta=150°$; (f) is an effect diagram when simulating $\alpha=2°$, and it is obtained by the simulation that P=5.5 mm and $\theta=132°$; (g) is an effect diagram when simulating $\alpha=5°$, and it is obtained by the simulation that P=1.7 mm and $\theta=108°$; (h) is an effect diagram when simulating $\alpha=7°$, and it is obtained by the simulation that P=1.5 mm and $\theta=100°$.

By performing actual measurements in the cases where $\alpha=5°$ and $\alpha=7°$, the following results are obtained: P=2.5 mm and $\theta=115°$ when $\alpha=5°$; and P=1 mm and $\theta=105°$ when $\alpha=7°$.

Based on the above simulation results and actually measured results, in some embodiments, the included angle between the third direction D3 and the first direction D1 is designed to be greater than or equal to 7°. It should be noted that FIGS. 7a and 7b exemplarily illustrate two different cases where the included angle between the third direction D3 and the first direction D1 is equal to 7°.

Further, in an embodiment, the included angle between the third direction D3 and the first direction D1 ranges from 50° to 60°, e.g., is 56°. While the moire patterns are "eliminated", considering existence of process errors, if the included angle between the third direction D3 and the first direction D1 is designed to be too small, a risk of the moire patterns still exists in subsequent fabrication processes if the process errors or process fluctuation occurs. Therefore, the included angle between the third direction D3 and the first direction D1 is designed to be relatively large, thereby fully avoiding the risk of occurrence of the moire patterns.

Figure 11:
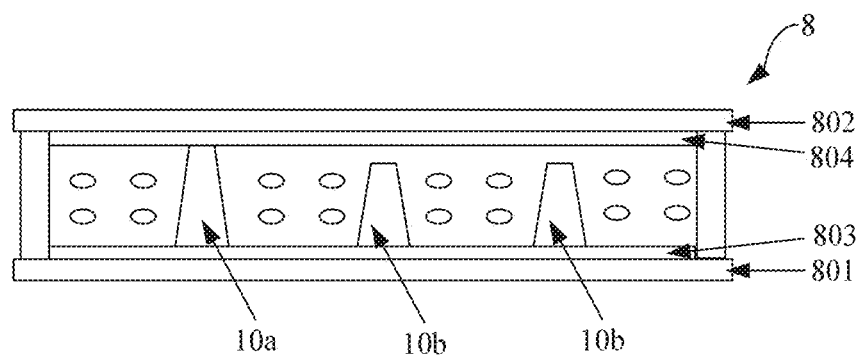
FIG. 11 is a schematic structural diagram of a second panel according to the embodiments of the present disclosure.

FIG. 11 is a schematic structural diagram of a second panel according to the embodiments of the present disclosure. As shown in FIG. 11, the second panel 8 includes a first base substrate 801 and a second base substrate 802 disposed opposite to each other. FIG. 11 only exemplarily illustrates a case where all support columns are disposed on the first base substrate 801, but this case is merely illustrative and does not limit the technical solutions of the present disclosure. In the embodiments of the present disclosure, all the support columns may be disposed on the first base substrate 801, or all the support columns may be disposed on the second base substrate 802, or a part of the support columns are disposed on the first base substrate 801 and the remaining part of the support columns are disposed on the second base substrate 802, and all these cases are within the scope of the present disclosure.

In some embodiments, the second panel 8 further includes a first electrode 803 and a second electrode 804, which are located between the first base substrate 801 and the second base substrate 802, and an electric field may be formed between the first electrode 803 and the second electrode 804 to control deflection of liquid crystal molecules in the second panel 8.

In some embodiments, the first electrode 803 is disposed on the first base substrate 801 and on a side of the first base substrate 801 facing the second base substrate 802, and the second electrode 804 is disposed on the second base substrate 802 and on a side of the second base substrate 802 facing the first base substrate 801; and further, the first electrode 803 and the second electrode 804 are both planar electrodes.

It should be noted that, in the embodiments of the present disclosure, the first electrode 803 and the second electrode 804 may also be both disposed on the first base substrate 801 or both on the second base substrate 802 (not shown), in which case the first electrode 803 and the second electrode 804 may be disposed in a same layer or in different layers, and a fringing electric field may be formed between the first electrode 803 and the second electrode 804 to control the deflection of the liquid crystal molecules in the second panel 8.

Figure 12:
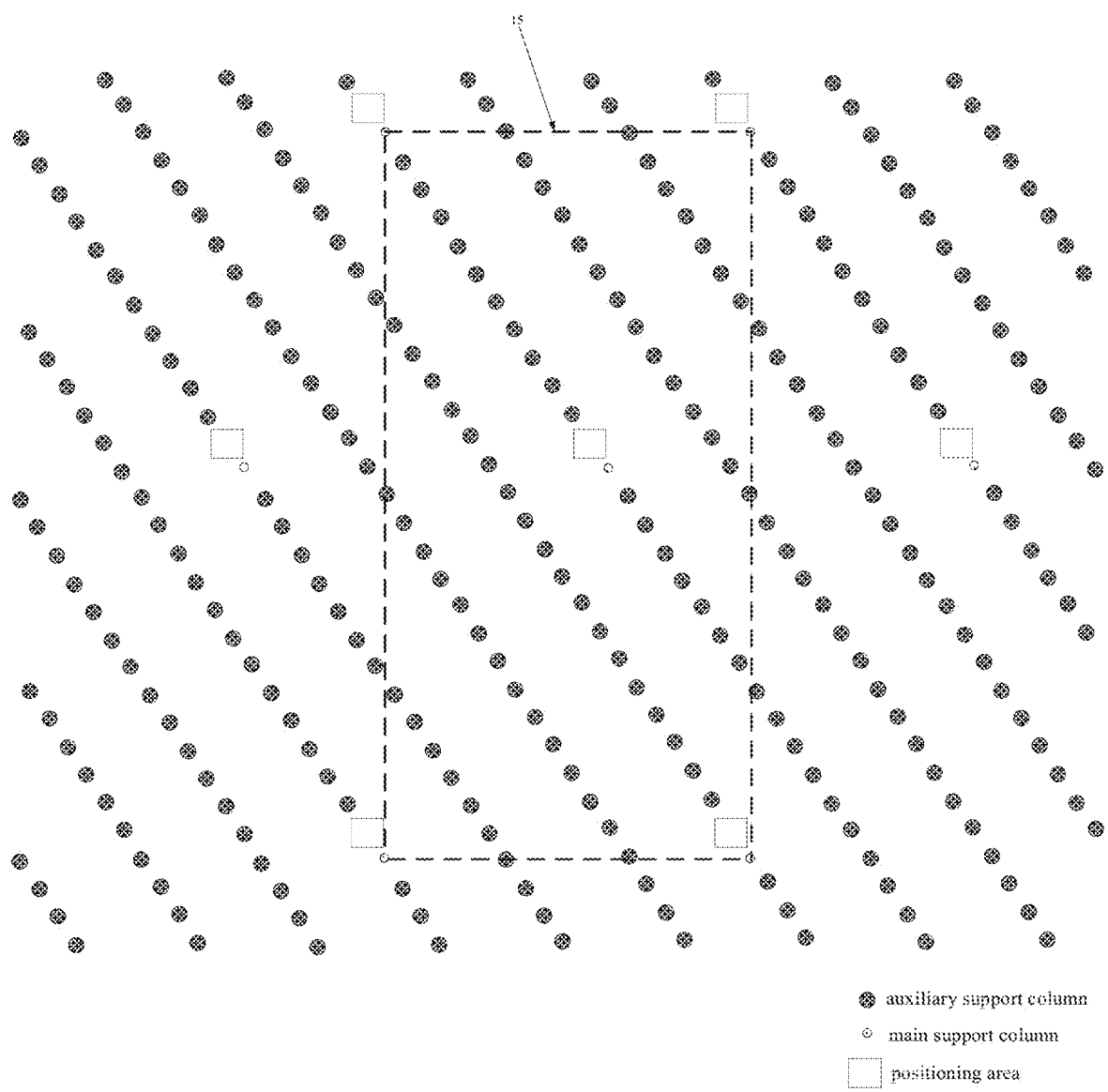
FIG. 12 is a schematic diagram illustrating distribution of a part of support columns in a second panel according to the embodiments of the present disclosure.
Figure 13:
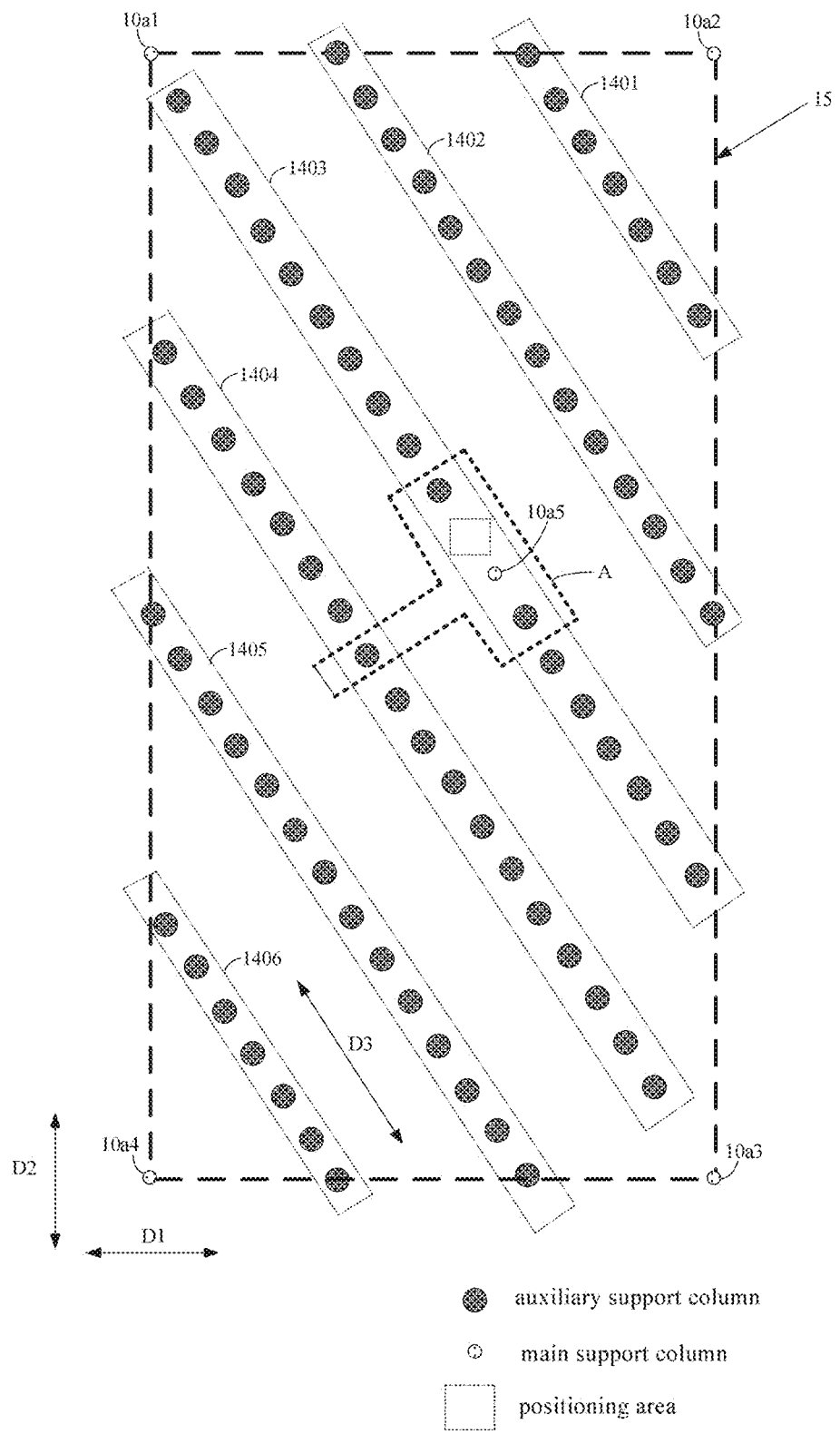
FIG. 13 is a schematic diagram illustrating distribution of support columns in a support column periodic unit shown in FIG. 12.
Figure 14:
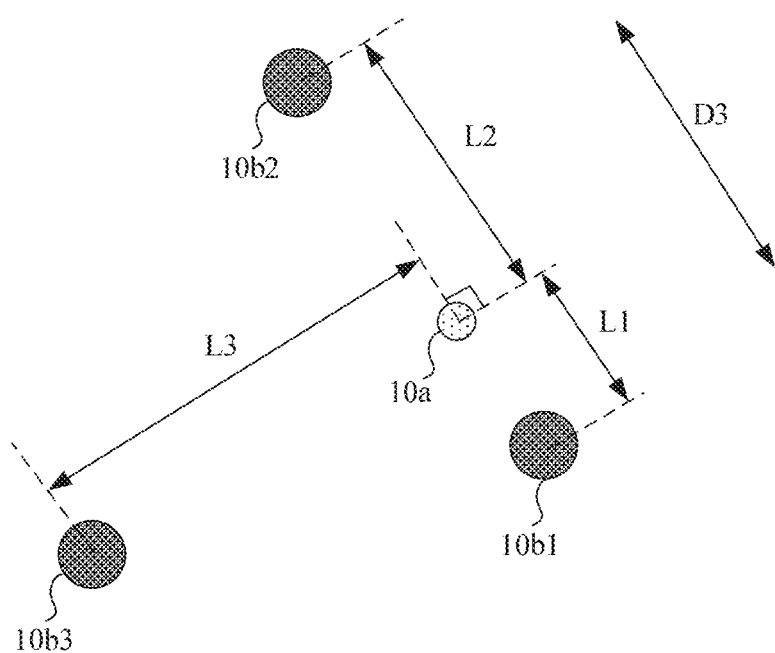
FIG. 14 is an enlarged view of region A shown in FIG. 13.

FIG. 12 is a schematic diagram illustrating distribution of a part of the support columns in the second panel according to the embodiments of the present disclosure, FIG. 13 is a schematic diagram illustrating distribution of support columns in one support column periodic unit shown in FIG. 12, and FIG. 14 is an enlarged view of region A shown in FIG. 13. As shown in FIGS. 12 to 14, in some embodiments, the support column periodic unit 15 includes a plurality of support columns, and the plurality of support columns include: at least one main support column 10a and a plurality of auxiliary support columns 10b, and a height of the main support column 10a in a direction perpendicular to the second panel 8 is larger than that of the auxiliary support columns 10b in the direction perpendicular to the second panel 8.

In a normal state, the main support column 10a has two ends respectively in contact with the two base substrates on both sides, while each auxiliary support column 10b has one end in contact with the base substrate on one side and the other end apart from the base substrate on the other side. When the second panel 8 is pressed, a thickness of a liquid crystal cell at a pressed position is reduced, so that the two ends of an auxiliary support column 10b at the pressed position are respectively brought into contact with the two base substrates on both sides to play a supporting role. In the second panel 8, an arrangement density of the main support columns 10a is smaller than that of the auxiliary support columns 10b. The arrangement density of the support columns refers to the number of the support columns arranged in a unit area.

In some embodiments, a ratio of the number of the main support columns 10a to the number of the auxiliary support columns 10b in the support column periodic unit 15 is: 1:50 to 1:10. With such design, a supporting strength of the support columns for a liquid crystal cell can be ensured. When display is performed in the anti-peep mode, the second panel for light adjustment may be disposed on a side of the first panel for display away from the backlight module, or between the first panel for display and the backlight module. When disposed between the first panel for display and the backlight module, the second panel for light adjustment needs to bear a weight of the first panel, so the supporting strength of the support columns of the second panel needs to be comprehensively considered. In the present disclosure, by designing the ratio of the number of the main support columns 10a to the number of the auxiliary support columns 10b in the support column periodic unit 15 to be from 1:50 to 1:10, requirements of the above two arrangement ways of the second panel can be met, an enough supporting strength can be ensured, and a display effect is not affected. Apparently, the number of the main support columns 10*a* and the number of the auxiliary support columns 10*b* in the support column periodic unit 15 can be respectively designed in a reasonable way according to actual needs in practical applications.

In some embodiments, a diameter of the main support columns 10*a* is smaller than that of the auxiliary support columns 10*b*. In some embodiments, the diameter of the main support columns 10*a* ranges from 10 µm to 14 µm, e.g., is 12 µm; and the diameter of the auxiliary support columns 10*b* ranges from 15 µm to 19 µm, e.g., is 17 µm. In the embodiments of the present disclosure, the diameter of the main support columns 10*a* and the diameter of the auxiliary support columns 10*b* may be designed respectively according to actual needs. In a case where the diameter of the auxiliary support columns is larger, a sufficient support force for the liquid crystal cell can be ensured when the liquid crystal cell is pressed.

Still with reference to FIGS. 12 and 13, in some embodiments, the display panel is divided into a plurality of periodic regions arranged in an array along the first direction D1 and the second direction D2, the periodic regions are in one-to-one correspondence with the support column periodic units 15, each support column periodic unit 15 is located in the corresponding periodic region, and the periodic regions are rectangular in shape; the support column periodic unit 15 includes at least four main support columns 10*a*, and four main support columns 10*a*1 to 10*a*4 among the at least four main support columns 10*a* are respectively located at four vertices of the corresponding periodic region; and four adjacent periodic regions arranged in a 2×2 array share one main support column at a common vertex thereof. In a process of monitoring the support columns, the periodic region corresponding to one support column periodic unit 15 may be determined only by acquiring four adjacent main support columns 10*a*1 to 10*a*4 arranged in a rectangular shape, which allows a machine to determine one to-be-monitored support column periodic unit 15 automatically and quickly.

In some embodiments, a distance between two main support columns 10*a* adjacent to each other in the first direction D1 (e.g., a distance between the main support column 10*a*1 and the main support column 10*a*2 in FIG. 13, or a distance between the main support column 10*a*3 and the main support column 10*a*4 in FIG. 13) is greater than 500 µm. Further, the distance between the two main support columns 10*a* adjacent to each other in the first direction D1 ranges from 500 µm to 600 µm, e.g., is 550 µm or 551 µm.

It should be noted that, in the embodiments of the present disclosure, the distance between two support columns may refer to a distance between centers of the two support columns, or a distance between edges of the two support columns on a same side. In the following description, the case where the distance between two support columns is the distance between the centers of the two support columns is taken as an example.

In some embodiments, a distance between two main support columns 10*a* adjacent to each other in the second direction D2 (e.g., a distance between the main support column 10*a*1 and the main support column 10*a*4 in FIG. 13, or a distance between the main support column 10*a*2 and the main support column 10*a*3 in FIG. 13) is greater than 1000 µm. Further, the distance between the two main support columns 10*a* adjacent to each other in the second direction D2 ranges from 1000 µm to 1200 µm, e.g., is 1100 µm or 1103 µm.

In some embodiments, there is a distance between two main support columns 10*a* adjacent to each other in the third direction D3 (e.g., a distance between the main support column 10*a*1 and a main support column 10*a*5 in FIG. 13). Further, the distance between the two main support columns 10*a* adjacent to each other in the third direction D3 ranges from 500 µm to 600 µm, e.g., is 550 µm or 551 µm.

In some embodiments, support columns other than the four main support columns 10*a*1 to 10*a*4 located at the four vertices of the corresponding periodic region in the support column periodic unit 15 are divided into a plurality of support column sub-groups 1401 to 1406; each of the plurality of support column sub-groups 1401 to 1406 includes a plurality of support columns arranged along the third direction D3, and each support column in the support column sub-groups 1401 to 1406 satisfies: a connection line between the support column and the support column closest thereto extends along the third direction D3.

It should be noted that a plurality of support column sub-groups located in different support column periodic units 15 and arranged along the third direction D3 may be spliced into one support column group 14, in which each support column satisfies: a connection line between the support column and the support column closest thereto extends along the third direction D3.

With reference to FIG. 13, in some embodiments, the support columns other than the four main support columns 10*a*1 to 10*a*4 located at the four vertices of the corresponding periodic region in the support column periodic unit 15 include: one main support column 10*a* and seventy-seven auxiliary support columns 10*b*.

In some embodiments, the four main support columns 10*a* located at the four vertices of the corresponding periodic region in the support column periodic unit 15 are: the first main support column 10*a*1, the second main support column 10*a*2 adjacent to the first main support column 10*a*1 in the first direction D1, the third main support column 10*a*3 adjacent to the second main support column 10*a*2 in the second direction D2, and the fourth main support column 10*a*4 adjacent to the third main support column 10*a*3 in the first direction D1.

The support columns other than the four main support columns 10*a*1 to 10*a*4 located at the four vertices of the corresponding periodic region in the support column periodic unit 15 are divided into six support column sub-groups 1401 to 1406, which are a first support column sub-group 1401, a second support column sub-group 1402, a third support column sub-group 1403, a fourth support column sub-group 1404, a fifth support column sub-group 1405, and a sixth support column sub-group 1406, respectively.

A connection line defined by any two support columns in the first support column sub-group 1401 passes through a point at one half of a line segment defined by the first main support column 10*a*1 and the second main support column 10*a*2 close to the second main support column 10*a*2.

A connection line defined by any two support columns in the second support column sub-group 1402 passes through a point at the other half of the line segment defined by the first main support column 10*a*1 and the second main support column 10*a*2 close to the first main support column 10*a*1.

A connection line defined by any two support columns in the third support column sub-group 1403 passes through the first main support column 10*a*1.

A connection line defined by any two support columns in the fourth support column sub-group 1404 passes through the third main support column 10*a*3.

A connection line defined by any two support columns in the fifth support column sub-group 1405 passes through a point at one half of a line segment defined by the third main support column 10a3 and the fourth main support column 10a4 close to the third main support column 10a3.

A connection line defined by any two support columns in the sixth support column sub-group 1406 passes through a point at the other half of the line segment defined by the third main support column 10a3 and the fourth main support column 10a4 close to the fourth main support column 10a4.

It should be noted that, in the embodiments of the present disclosure, the connection line defined by two support columns passing through a certain support column may refer to a straight line corresponding to the connection line passing through an area defined by the certain support column, for example, the straight line corresponding to the connection line passes through a center of the certain support column. In the following description, the case where the straight line corresponding to the connection line passes through the center of the certain support column is taken as an example.

In the embodiments of the present disclosure, the line segment defined by two support columns may refer to a line segment defined by centers of the two support columns, or a line segment defined by edge points of the two support columns on a same side. In the following description, the case where the line segment defined by the two support columns is the line segment defined by the centers of the two support columns is taken as an example.

Still with reference to FIG. 13, in some embodiments, the first support column sub-group 1401 includes seven auxiliary support columns 10b, and one of the auxiliary support columns 10b is located at a trisection point of the line segment defined by the first main support column 10a1 and the second main support column 10a2 close to the second main support column 10a2.

The second support column sub-group 1402 includes fourteen auxiliary support columns 10b, one of the auxiliary support columns 10b is located at a trisection point of the line segment defined by the first main support column 10a1 and the second main support column 10a2 close to the first main support column 10a1, and one of the auxiliary support columns 10b is located close to a midpoint of the line segment defined by the second main support column 10a2 and the third main support column 10a3. In an embodiment, an area where the auxiliary support column 10b close to the midpoint of the line segment defined by the second main support column 10a2 and the third main support column 10a3 is located covers the midpoint of the line segment defined by the second main support column 10a2 and the third main support column 10a3; and for example, a center of the auxiliary support column 10b is located at the midpoint of the line segment defined by the second main support column 10a2 and the third main support column 10a3.

The third support column sub-group 1403 includes seventeen auxiliary support columns 10b and one fifth main support column 10a5, and one positioning area and ten auxiliary support columns 10b are sequentially arranged along the third direction D3 and along a direction departing from the fifth main support column 10a5 toward the first main support column 10a1.

The fourth support column sub-group 1404 includes eighteen auxiliary support columns 10b, and one positioning area is provided between the fourth support column sub-group 1404 and the third main support column.

The fifth support column sub-group 1405 includes fourteen auxiliary support columns 10b, and one of the auxiliary support columns 10b is located at a trisection point of the line segment defined by the third main support column 10a3 and the fourth main support column 10a4 close to the third main support column 10a3, and one of the auxiliary support columns 10b is located close to a midpoint of the line segment defined by the first main support column 10a1 and the fourth main support column 10a4. In an embodiment, an area where the auxiliary support column 10b close to the midpoint of the line segment determined by the first main support column 10a1 and the fourth main support column 10a4 is located covers the midpoint of the line segment determined by the first main support column 10a1 and the fourth main support column 10a4; and for example, a center of the auxiliary support column 10b is located at the midpoint of the line segment defined by the first main support column 10a1 and the fourth main support column 10a4.

The sixth support column sub-group 1406 includes seven auxiliary support columns 10b, and one of the auxiliary support columns 10b is located at a trisection point of the line segment defined by the third main support column 10a3 and the fourth main support column 10a4 close to the fourth main support column 10a4.

In some embodiments, the main support column 10a is provided with at least one corresponding positioning area, and each positioning area is arranged adjacent to the corresponding main support column 10a in the third direction D3. In the embodiments of the present disclosure, by providing the main support column 10a with the corresponding positioning area, fast positioning of the main support column 10a in the second panel 8 is facilitated.

In some embodiments, the main support column 10a is provided with only one corresponding positioning area. Such design can not only ensure easy positioning, but can also ensure a sufficient supporting function.

With reference to FIG. 14, the second panel 8 includes a first auxiliary support column 10b1, a main support column 10a, a positioning area corresponding to the main support column 10a, and a second auxiliary support column 10b2 which are sequentially arranged along the third direction D3, a first preset distance L1 is provided between the main support column 10a and the first auxiliary support column 10b1, a second preset distance L2 is provided between the main support column 10a and the second auxiliary support column 10b2, and the first preset distance L1 is smaller than the second preset distance L2. In some embodiments, a ratio of the first preset distance L1 to the second preset distance L2 ranges from 1:5 to 4:5; and for example, the ratio of the first preset distance L1 to the second preset distance L2 is 1:2.

With reference to FIG. 14, in some embodiments, the second panel 8 includes the main support column 10a and a third auxiliary support column 10b3 arranged adjacent to each other along a direction perpendicular to the third direction D3, a third preset distance L3 is provided between the main support column 10a and the third auxiliary support column 10b3, and the third preset distance L3 is larger than the second preset distance L2.

Still with reference to FIG. 14, in some embodiments, the first preset distance L1 ranges from 40 μm to 70 μm, e.g., is 51 μm; the second preset distance L2 ranges from 80 μm to 120 μm, e.g., is 102 μm; and the third preset distance L3 ranges from 130 μm to 170 μm, e.g., is 153 μm.

Figure 15:
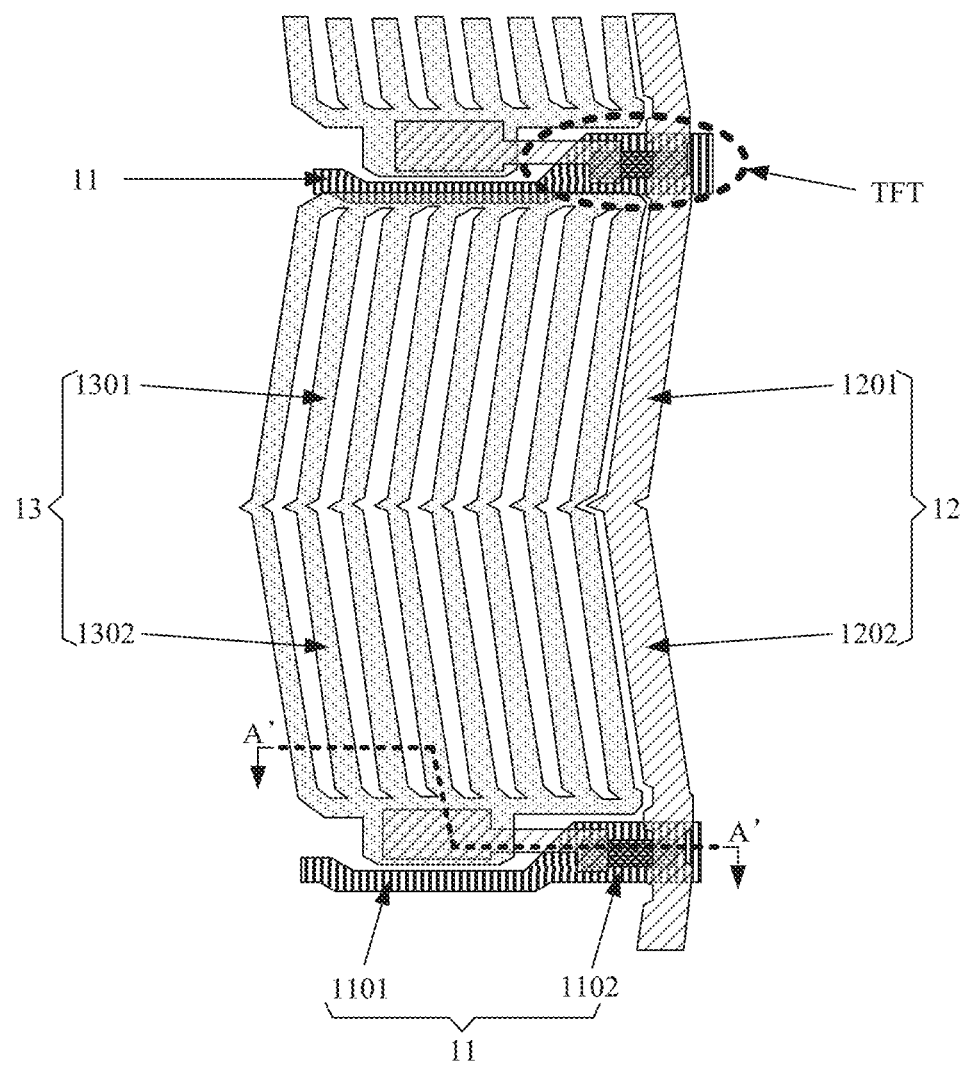
FIG. 15 is a top view of a pixel region of an array substrate in a first panel according to the embodiments of the present disclosure.
Figure 16:
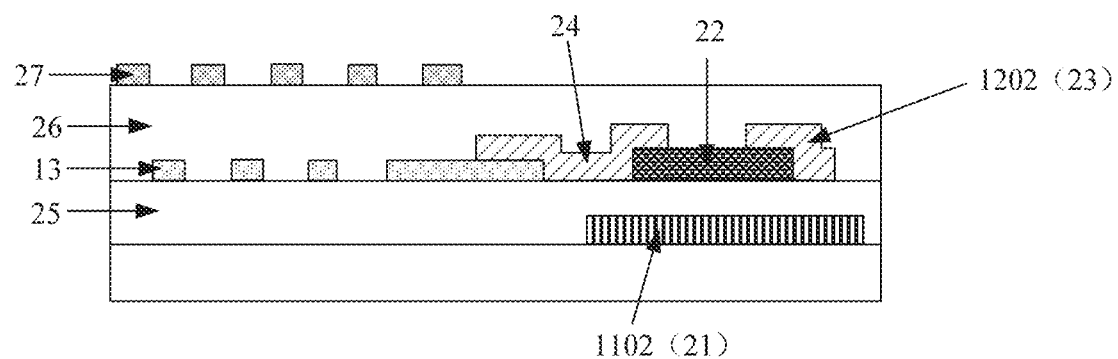
FIG. 16 is a cross-sectional view along direction A-A' in FIG. 15.

FIG. 15 is a top view of a partial region of an array substrate in the first panel according to the embodiments of the present disclosure, and FIG. 16 is a cross-sectional view along direction A-A' in FIG. 15. As shown in FIGS. 15 and 16, the first panel 9 is provided with an array substrate and a counter substrate disposed opposite to each other, the first panel 9 includes a plurality of pixel regions, the pixel region includes a transistor TFT and a pixel electrode 13, and the transistor TFT and the pixel electrode 13 are both located on the array substrate. The pixel electrode 13 includes a plurality of first branch electrodes 1301 extending along a fourth direction D4 and a plurality of second branch electrodes 1302 extending along a fifth direction D5. In the embodiments of the present disclosure, the pixel electrode is a dual-domain electrode, and a region where the first branch electrodes 1301 are connected to the second branch electrodes 1302 is a domain line region. The transistor TFT has a gate electrode 21 connected to a corresponding gate line 11, a source electrode 23 connected to a corresponding data line 12, and a drain electrode 24 connected to a corresponding pixel electrode 13.

The data line 12 includes first portions 1201 and second portions 1202 alternately arranged, a first portion 1201 is connected to a second portion 1202, the first portion 1201 extends along the fourth direction D4, the second portion 1202 extends along the fifth direction D5, the first portion 1201 and the first branch electrodes are arranged along the first direction D1, and the second portion 1202 and the second branch electrodes are arranged along the first direction D1. In some embodiments, a part of the second portion 1202 is also used as the source electrode 23 of the transistor TFT.

The gate line includes third portions 1101 and fourth portions 1102 alternately arranged, a third portion 1101 is connected to a fourth portion 1102, a width of the third portion 1101 in the second direction D2 is smaller than that of the fourth portion 1102 in the second direction D2, and the fourth portion 1102 is also used as the gate electrode 21 of the transistor TFT.

In some embodiments, in a direction perpendicular to the first display panel, the third portion 1101 overlaps a pixel electrode 13 located in a pixel region in the next row to form storage capacitance.

In some embodiments, a common electrode 27 is further disposed on the array substrate, and an electric field is formed between the pixel electrodes 13 and the common electrode 27 to control deflection of liquid crystal molecules in the corresponding pixel regions. Apparently, the common electrode 27 may be disposed on the counter substrate.

Steps for fabricating the array substrate shown in FIG. 16 are roughly as follows: first fabricating a gate metal layer (including patterns of the gate electrodes 21 and the gate lines 11) by a patterning process; fabricating a gate insulating layer 25; fabricating a semiconductor layer (including patterns of active layers 22) by a patterning process; fabricating patterns of the pixel electrodes 13 by a patterning process; fabricating a source-drain metal layer (including patterns of the source electrodes 23, the drain electrodes 24, and the data lines 12) by a patterning process; then fabricating a passivation layer 26; and finally patterning a pattern of the common electrode 27 by a patterning process (in a case where the common electrode is located on a side of the pixel electrodes away from the first base substrate, the common electrode is a slit electrode).

In an embodiment, in the case where the common electrode is located on the side of the pixel electrode away from the base substrate, the pixel electrode may be a plate electrode without an electrode slit, and the common electrode may be provided with a slit; and the common electrode is designed as illustrated by FIG. 15, and includes branch electrodes extending along two directions. In an embodiment, in a case where the common electrode is disposed on a side of the pixel electrodes close to the base substrate, the common electrode may be a plate electrode without an electrode slit, and the pixel electrode is designed as shown in FIG. 15, which is not limited herein.

Figure 17:
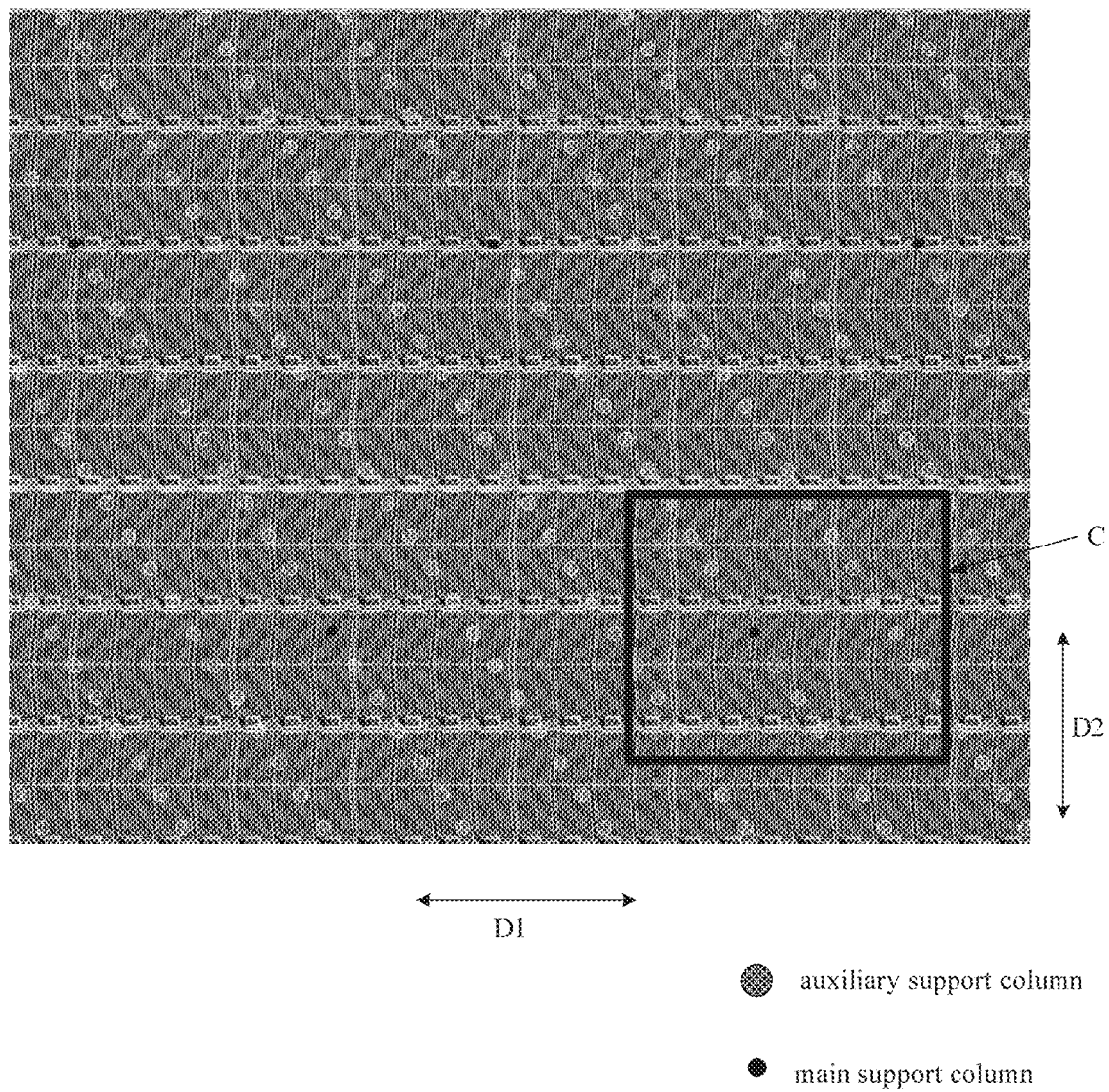
FIG. 17 is a top view of a partial region of a display panel according to the embodiments of the present disclosure.
Figure 18:
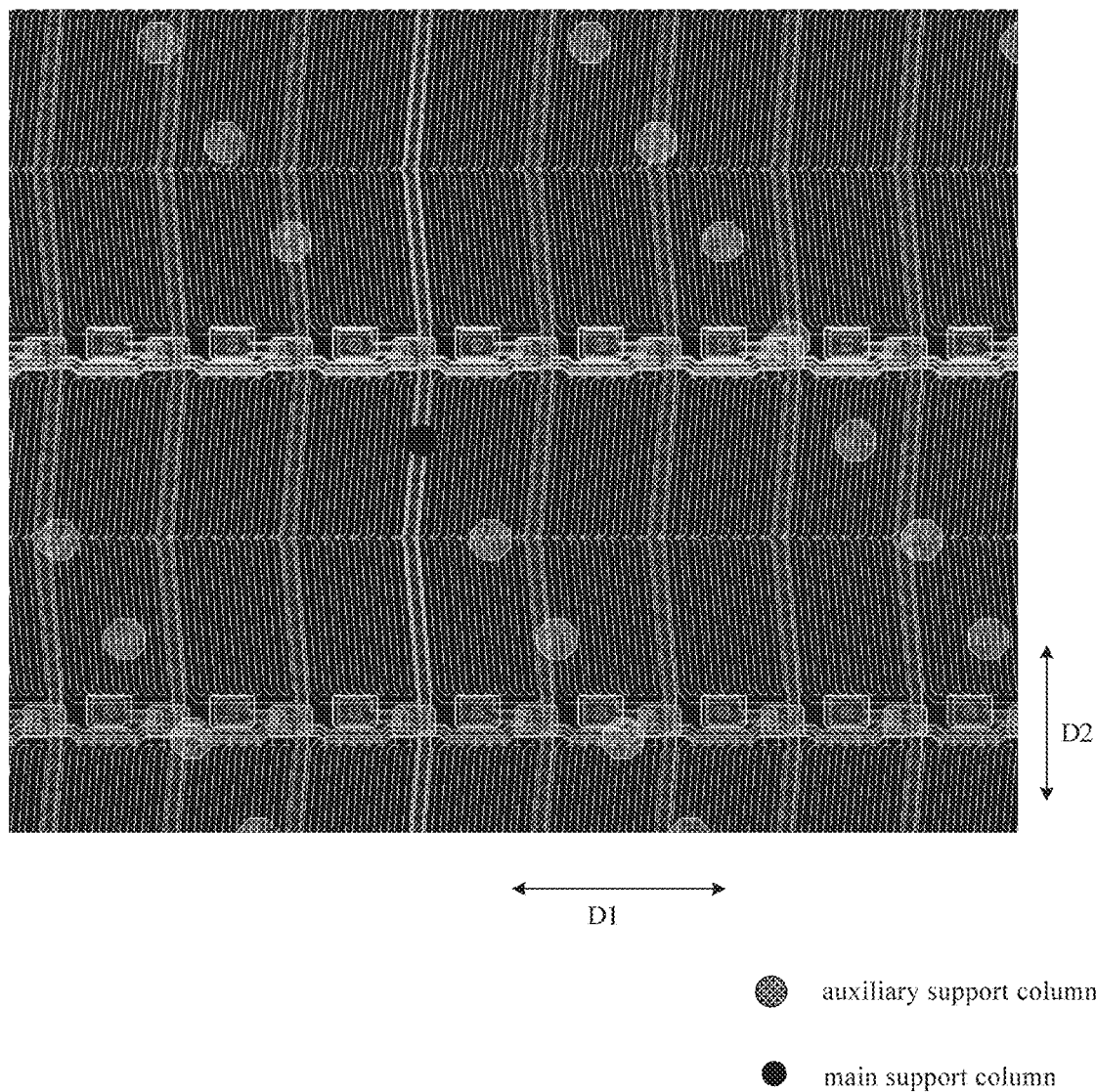
FIG. 18 is an enlarged view of region C in FIG. 17.
Figure 19:
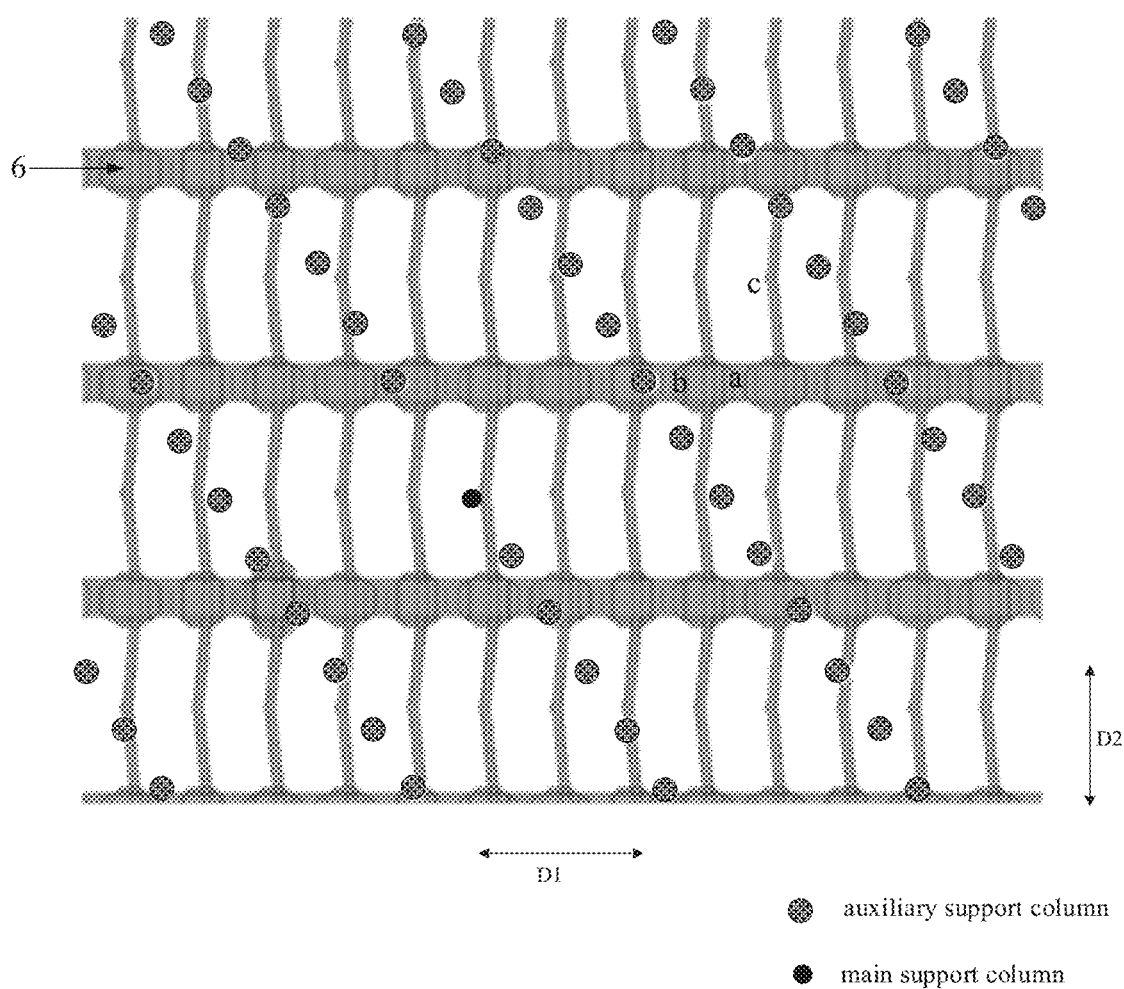
FIG. 19 is a top view of a black matrix and support columns in a partial region of a display panel according to the embodiments of the present disclosure.

FIG. 17 is a top view of a partial region of a display panel according to the embodiments of the present disclosure, FIG. 18 is an enlarged view of region C in FIG. 17, and FIG. 19 is a top view of a black matrix and support columns in a partial region of a display panel according to the embodiments of the present disclosure. As shown in FIGS. 17 to 19, in a direction perpendicular to the second panel, a part of the main support columns included in the second panel overlap the first branch electrodes 1301 in the first display panel; and/or, in the direction perpendicular to the second panel, a part of the main support columns included in the second panel overlap the second branch electrodes 1302 in the first display panel; and/or, in the direction perpendicular to the second panel, a part of the main support columns included in the second panel overlap the data lines 1212 in the first display panel; and/or, in the direction perpendicular to the second panel, a part of the main support columns included in the second panel at least overlap the gate lines 11 in the first display panel; and/or, in the direction perpendicular to the second panel, a part of the auxiliary support columns included in the second panel at least overlap the first branch electrodes 1301 in the first display panel; and/or, in the direction perpendicular to the second panel, a part of the auxiliary support columns included in the second panel at least overlap the second branch electrodes 1302 in the first display panel; and/or, in the direction perpendicular to the second panel, a part of the auxiliary support columns included in the second panel overlap the data lines 1212 in the first display panel; and/or, in the direction perpendicular to the second panel, a part of the auxiliary support columns included in the second panel overlap the gate lines 11 in the first display panel; and/or, in the direction perpendicular to the second panel, a part of the auxiliary support columns included in the second panel overlap the transistors in the first display panel.

With reference to FIG. 19, a width, at intersections with the data lines, of the black matrix along an extending direction of the gate lines is greater than a width b of the black matrix between two adjacent pixel regions in an extending direction of the data lines; and the width a of the black matrix at the intersections with the data lines is larger so as to produce a better light shielding effect on the transistors. With such designed black matrix, and in view of the problem of the moire patterns caused by the support columns extending along the direction of the gate lines in the related art, by adopting the design disclosed herein, that is, the designing of a certain included angle between the extending direction of the plurality of consecutive support columns and the gate lines, the problem of the moire patterns can be alleviated. In an embodiment, a width of the data lines is c, a ratio of a to c ranges from 3 to 9 inclusive, e.g., 3, 4, 5, 5.5, 6, 6.5, 7, 7.5, 8, or 9, and a ratio of a to b ranges from 0.5 to 3 inclusive, e.g., 0.5, 1, 1.5, 2, 2.5, or 3. In an embodiment, a is greater than 30 μm, e.g., 35 μm, 38 μm, 39 μm, or 40 μm; b is greater than 20 μm, e.g., 25 μm, 27 μm, or 29 μm; and c is greater than 4 μm, e.g., 5 μm, 6 μm, or 7 μm.

In some embodiments, along the first direction D1, two adjacent auxiliary support columns are separated by at least two adjacent pixel regions.

Figure 20:
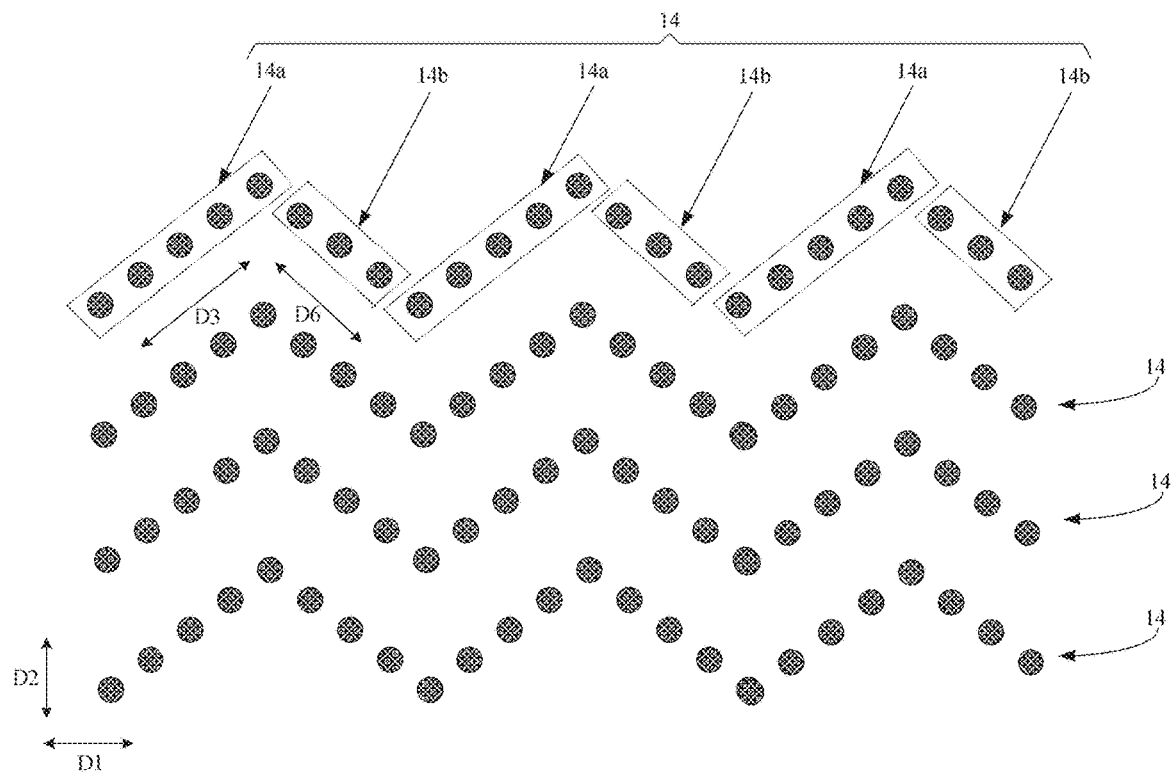
FIG. 20 is another top view of a partial region of a second panel according to the embodiments of the present disclosure.

FIG. 20 is another top view of a partial region of the second panel according to the embodiments of the present disclosure. As shown in FIG. 20, in some embodiments, the plurality of support columns in the second panel 8 form a plurality of support column groups 14 each including first support column sub-groups 14a and second support column sub-groups 14b which are alternately arranged along the first direction D1; each of the first support column sub-groups 14a includes a plurality of support columns arranged along the third direction D3, and each support column in the first support column sub-group 14a satisfies: a connection line between the support column and the support column closest thereto extends along the third direction D3; each of the second support column sub-groups 14b includes a plurality of support columns arranged along the sixth direction D6, and each support column in the second support column sub-group 14b satisfies: a connection line between the support column and the support column closest thereto extends along the sixth direction D6; and an included angle between the sixth direction D6 and the third direction D3 is not equal to 0°, and an included angle between the sixth direction D6 and the first direction D1 is equal to the included angle between the third direction D3 and the first direction D1. With such design, the arrangement of the support columns can be changed in such a way that the arrangement of the support columns is significantly different from the arrangement of the first light-shielding strips, so that the support columns and the first light-shielding strips can be effectively prevented from forming the beat, thereby effectively avoiding the occurrence of the moire patterns.

Figure 21:
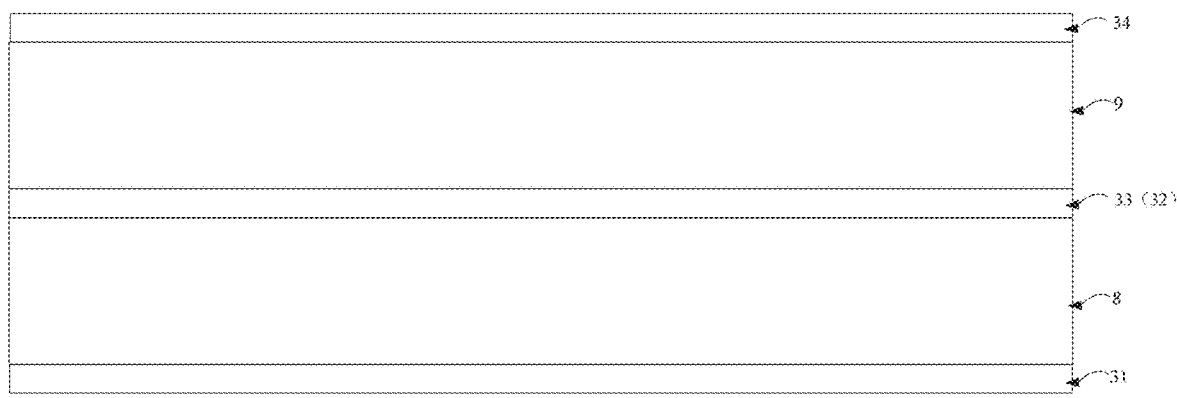
FIG. 21 is another schematic structural diagram of a display panel according to the embodiments of the present disclosure.

FIG. 21 is another schematic structural diagram of a display panel according to the embodiments of the present disclosure. As shown in FIG. 21, in some embodiments, a first polarizer 31 is disposed on a side of the second panel 8 away from the first panel 9, a second polarizer 32 is disposed on a side of the second panel 8 facing the first panel 9, and a polarization direction of the first polarizer 31 is the same as that of the second polarizer 32.

A third polarizer 33 is disposed on a side of the first panel 9 facing the second panel 8, a fourth polarizer 34 is disposed on a side of the first panel 9 away from the second panel 8, a polarization direction of the third polarizer 33 is the same as that of the second polarizer 32, and a polarization direction of the fourth polarizer 34 is perpendicular to that of the first polarizer 31.

In some embodiments, the third polarizer 33 and the second polarizer 32 are a same polarizer, which can effectively reduce an overall thickness of the display panel.

A case where transmission axes of the first polarizer 31 to the third polarizer 33 are all 0° and a transmission axis of the fourth polarizer 34 is 90° is taken as an example.

When the voltage difference ΔV between the voltages applied to the first electrode and the second electrode is 0V (the voltages applied to the first electrode and the second electrode are equal), the liquid crystal molecules in the second panel 8 do not deflect, and light emitted by the backlight module passes through the first polarizer 31, the liquid crystal layer in the second panel 8, and the second polarizer 32 to reach the third polarizer 33, during which the liquid crystal layer in the second panel 8 does not affect a polarization direction of the light, that is, the light emitted from the second panel 8 includes both light with a front viewing angle (light having a small included angle relative to a normal of the second panel 8, e.g., light whose included angle relative to the normal of the second panel 8 is less than or equal to 30°) and light with a side viewing angle (light having a large included angle relative to the normal of the second panel 8, e.g., light whose included angle relative to the normal of the second panel 8 is greater than 30°); subsequently, the light emitted from the second panel 8 sequentially passes through the third polarizer 33, the liquid crystal layer in the first panel 9, and the fourth polarizer 34 to realize image display, in this case, the light emitted from the first panel 9 includes both the light with the front viewing angle and the light with the side viewing angle, that is, the display device operates in the sharing mode.

When the voltage difference ΔV between the voltages applied to the first electrode and the second electrode is a preset value (e.g., 5V), the liquid crystal molecules in the second panel 8 deflect to a certain angle, and the light emitted by the backlight module passes through the first polarizer 31, the liquid crystal layer in the second panel 8, and the second polarizer 32 to reach the third polarizer 33, during which the liquid crystal layer in the second panel 8 has a relatively small influence on a polarization direction of the light having the small included angle relative to the normal of the second panel 8 (the liquid crystal layer in the second panel 8 almost has no influence on the polarization direction of the light whose included angle relative to the normal of the second panel 8 is 0°), thus allowing the light with the small included angle to pass through the second polarizer 32; meanwhile the liquid crystal layer in the second panel 8 has a relatively large influence on a polarization direction of the light having the large included angle relative to the normal of the second panel 8, and causes the polarization direction of the light to be perpendicular or substantially perpendicular to the transmission axis of the second polarizer 32 when the light reaches the second polarizer 32, thus preventing the light with the large included angle from passing through the second polarizer 32; that is, the light emitted from the second panel 8 only includes the light with the front viewing angle. Subsequently, the light emitted from the second panel 8 sequentially passes through the third polarizer 33, the liquid crystal layer in the first panel 9, and the fourth polarizer 34 to realize the image display, in this case, the light emitted from the first panel 9 also only includes the light with the front viewing angle, that is, the display device operates in the anti-peep mode.

Figure 22:
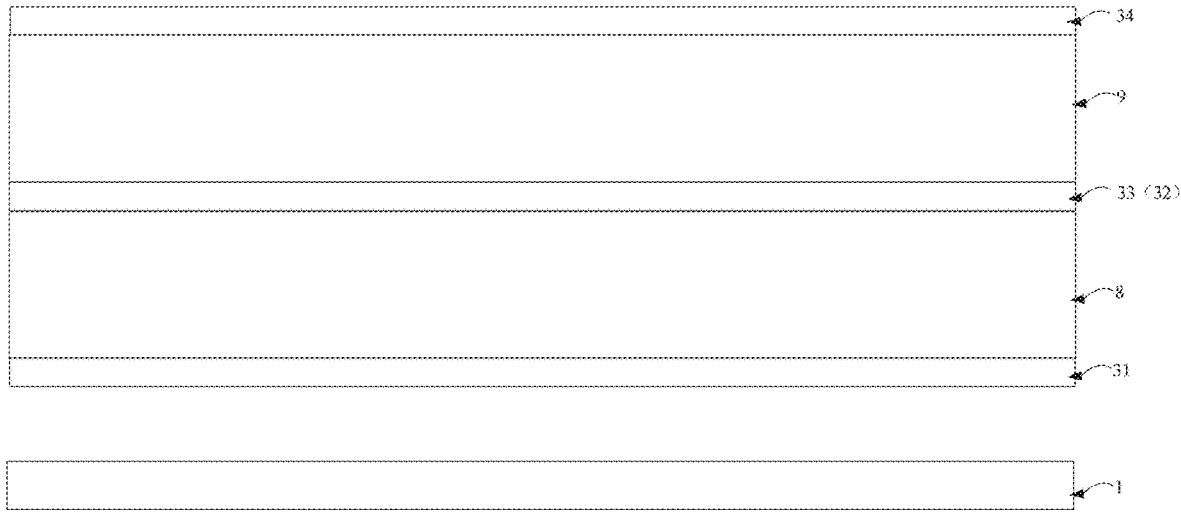
FIG. 22 is a schematic structural diagram of a display device according to the embodiments of the present disclosure.

FIG. 22 is a schematic structural diagram of a display device according to the embodiments of the present disclosure. As shown in FIG. 22, the display device includes: a backlight module 1 and a display panel. The display panel is the display panel provided in the above embodiments, and both the first panel 9 and the second panel 8 in the display panel are located on a light emission side of the backlight module 1. Reference may be made to the content of the above embodiments for a description of the display panel, and the display panel will not be described in detail here.

Figure 23:
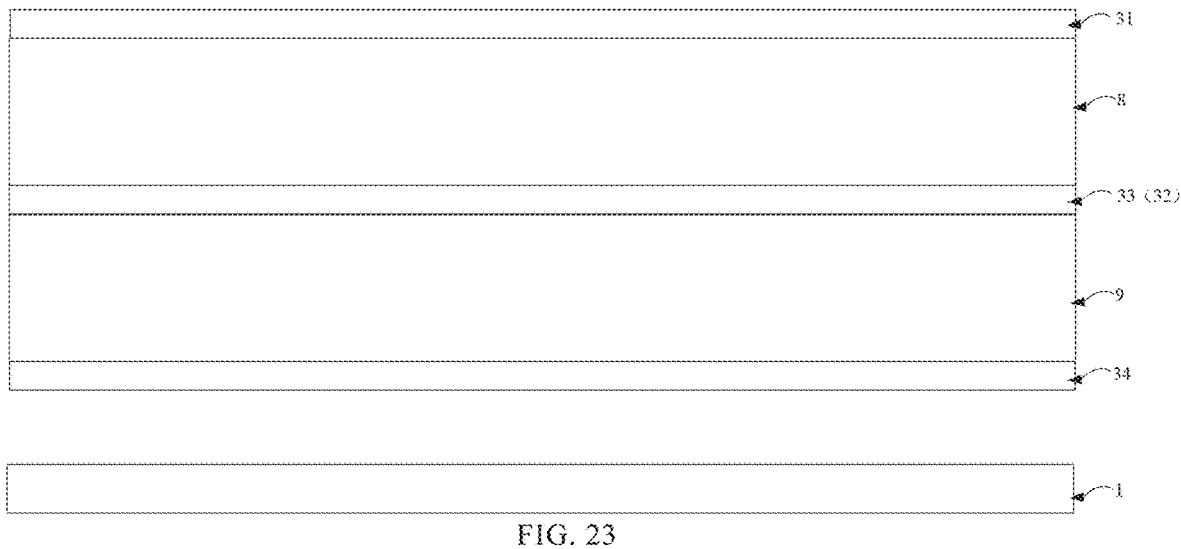
FIG. 23 is a schematic structural diagram of another display device according to the embodiments of the present disclosure.

FIG. 23 is a schematic structural diagram of another display device according to the embodiments of the present disclosure. As shown in FIG. 23, unlike a case where the first panel 9 is located on a side of the second panel 8 away from the backlight module 1 as shown in FIG. 22, the second panel 8 is located on a side of the first panel 9 away from the backlight module 1 in FIG. 23, in which case a viewing angle of emitted light can also be controlled through the second panel 8 (reference may be made to the above content for a specific principle), thereby switching the display device between a sharing mode and an anti-peep mode.

It should be understood that the above embodiments are merely exemplary embodiments adopted to illustrate the principle of the present disclosure, and the present disclosure is not limited thereto. Various modifications and improvements can be made by those of ordinary skill in the art without departing from the spirit and essence of the present disclosure, and those modifications and improvements are also considered to fall within the scope of the present disclosure.

What is claimed is:

1. A display panel, comprising: a first panel and a second panel opposite to the first panel;
   wherein the first panel comprises: gate lines extending along a first direction and data lines extending along a second direction, and the gate lines and the data lines intersect to define pixel regions; and
   the second panel comprises: a plurality of support column periodic units arranged in an array along the first direction and the second direction, each of the plurality of support column periodic units comprises a plurality of support columns, and at least a part of the support columns each satisfy: an imaginary connection line between the support column and a support column closest thereto extends along a third direction, and an included angle between the third direction and the first direction is not equal to 0°,
   wherein the first panel comprises a plurality of pixel regions each comprising a transistor and a pixel electrode, the pixel electrode comprises a plurality of first branch electrodes extending along a fourth direction and a plurality of second branch electrodes extending along a fifth direction, and the first branch electrodes are connected to the second branch electrodes;
   the transistor has a gate electrode connected to a corresponding gate line, a source electrode connected to a corresponding data line, and a drain electrode connected to a corresponding pixel electrode; and
   each of the data lines comprises a first portion and a second portion alternately arranged, the first portion is connected to the second portion, the first portion extends along the fourth direction, the second portion extends along the fifth direction, the first portion and the first branch electrodes are arranged along the first direction, and the second portion and the second branch electrodes are arranged along the first direction,
   wherein a plurality of support columns in the second panel form a plurality of support column groups, and each of the plurality of support column groups comprises a plurality of support columns arranged along the third direction, and each support column in the support column group satisfies: an imaginary connection line between the support column and a support column closest thereto extends along the third direction,
   wherein the plurality of support columns in each of the plurality of support column periodic units comprise: at least one main support column and a plurality of auxiliary support columns; and a ratio of the number of the at least one main support columns to the number of the plurality of auxiliary support columns in each of the plurality of the support column periodic units is in the range of 1:50 to 1:10,
   wherein, in a direction perpendicular to the second panel, a part of main support columns in the second panel overlap the plurality of first branch electrodes in the first display panel;
   and/or, in the direction perpendicular to the second panel, a part of the main support columns in the second panel overlap the plurality of second branch electrodes in the first display panel;
   and/or, in the direction perpendicular to the second panel, a part of the main support columns in the second panel overlap the data lines in the first display panel;
   and/or, in the direction perpendicular to the second panel, a part of the main support columns in the second panel at least partially overlap the gate lines in the first display panel;
   and/or, in the direction perpendicular to the second panel, a part of auxiliary support columns in the second panel overlap the plurality of first branch electrodes in the first display panel;
   and/or, in the direction perpendicular to the second panel, a part of the auxiliary support columns in the second panel overlap the plurality of second branch electrodes in the first display panel;
   and/or, in the direction perpendicular to the second panel, a part of the auxiliary support columns in the second panel overlap the data lines in the first display panel;
   and/or, in the direction perpendicular to the second panel, a part of the auxiliary support columns in the second panel overlap the gate lines in the first display panel;
   and/or, in the direction perpendicular to the second panel, a part of the auxiliary support columns in the second panel overlap transistors in the first display panel.

2. The display panel of claim 1, wherein the included angle between the third direction and the first direction is greater than or equal to 7°.

3. The display panel of claim 1, wherein the first panel further comprises: a black matrix comprising a plurality of first light-shielding strips extending along the first direction and a plurality of second light-shielding strips extending along the second direction; and
   the plurality of first light-shielding strips cover areas where the gate lines are located, and the plurality of second light-shielding strips cover areas where the data lines are located; and a width, at intersections with the data lines, of the black matrix along an extending direction of the gate lines is greater than a width of the black matrix between two adjacent pixel regions in an extending direction of the data lines.

4. The display panel of claim 1, wherein the display panel is divided into a plurality of periodic regions arranged in an array along the first direction and the second direction, the plurality of periodic regions are in one-to-one correspondence with the plurality of support column periodic units, each of the plurality of support column periodic units is in a corresponding periodic region, and the periodic regions are rectangular in shape;
   each of the plurality of support column periodic units comprises at least four main support columns, and four main support columns of the at least four main support columns are at four vertices of the corresponding periodic region respectively; and
   four adjacent periodic regions arranged in a 2×2 array share one main support column at a common vertex.

5. The display panel of claim 4, wherein a distance between two main support columns adjacent to each other in the first direction is greater than 500 μm; and
   a distance between two main support columns adjacent to each other in the second direction is greater than 1000 μm.

6. The display panel of claim 4, wherein support columns other than the four main support columns at the four vertices of the corresponding periodic region in each of the plurality of support column periodic units are divided into a plurality of support column sub-groups; and
   each of the plurality of support column sub-groups comprises a plurality of support columns arranged along the third direction, and each of the plurality of support columns in the support column sub-group satisfies: an imaginary connection line between the support column and a column closest thereto extends along the third direction.

7. The display panel of claim 6, wherein the support columns other than the four main support columns at the four vertices of the corresponding periodic region in each of the plurality of support column periodic units comprise: one main support column and seventy-seven auxiliary support columns.

8. The display panel of claim 6, wherein the four main support columns at the four vertices of the corresponding periodic region in each of the plurality of support column periodic units are: a first main support column, a second main support column adjacent to the first main support column in the first direction, a third main support column adjacent to the second main support column in the second direction, and a fourth main support column adjacent to the third main support column in the first direction;
the support columns other than the four main support columns at the four vertices of the corresponding periodic region in each of the plurality of support column periodic units are divided into six support column sub-groups, which are a first support column sub-group, a second support column sub-group, a third support column sub-group, a fourth support column sub-group, a fifth support column sub-group, and a sixth support column sub-group, respectively;
an imaginary connection line defined by any two support columns in the first support column sub-group passes through a point at one half of a line segment defined by the first main support column and the second main support column close to the second main support column;
an imaginary connection line defined by any two support columns in the second support column sub-group passes through a point at the other half of the line segment defined by the first main support column and the second main support column close to the first main support column;
an imaginary connection line defined by any two support columns in the third support column sub-group passes through the first main support column;
an imaginary connection line defined by any two support columns in the fourth support column sub-group passes through the third main support column;
an imaginary connection line defined by any two support columns in the fifth support column sub-group passes through a point at one half of a line segment defined by the third main support column and the fourth main support column close to the third main support column; and
an imaginary connection line defined by any two support columns in the sixth support column sub-group passes through a point at the other half of the line segment defined by the third main support column and the fourth main support column close to the fourth main support column.

9. The display panel of claim 8, wherein the first support column sub-group comprises seven auxiliary support columns, and one of the seven auxiliary support columns is at a trisection point of the line segment defined by the first main support column and the second main support column close to the second main support column;
the second support column sub-group comprises fourteen auxiliary support columns, one of the fourteen auxiliary support columns is at a trisection point of the line segment defined by the first main support column and the second main support column close to the first main support column, and one of the fourteen auxiliary support columns is close to a midpoint of the line segment defined by the second main support column and the third main support column;
the third support column sub-group comprises seventeen auxiliary support columns and one fifth main support column, and one positioning area and ten of the seventeen auxiliary support columns are sequentially arranged along the third direction and along a direction departing from the fifth main support column toward the first main support column;
the fourth support column sub-group comprises eighteen auxiliary support columns, and one positioning area is between the fourth support column sub-group and the third main support column;
the fifth support column sub-group comprises fourteen auxiliary support columns, and one of the fourteen auxiliary support columns is at a trisection point of the line segment defined by the third main support column and the fourth main support column close to the third main support column, and one of the fourteen auxiliary support columns is close to a midpoint of the line segment defined by the first main support column and the fourth main support column; and
the sixth support column sub-group comprises seven auxiliary support columns, and one of the seven auxiliary support columns is at a trisection point of the line segment defined by the third main support column and the fourth main support column close to the fourth main support column.

10. The display panel of claim 1, wherein the main support column is provided with at least one positioning area corresponding thereto, and the at least one positioning area is adjacent to the corresponding main support column in the third direction.

11. The display panel of claim 10, wherein the main support column is provided with only one corresponding positioning area, and
the second panel comprises a first auxiliary support column, a main support column, a positioning area corresponding to the main support column, and a second auxiliary support column arranged along the third direction in sequence, a first preset distance is provided between a center of the main support column and a center of the first auxiliary support column, a second preset distance is provided between the center of the main support column and a center of the second auxiliary support column, and the first preset distance is smaller than the second preset distance; and a ratio of the first preset distance to the second preset distance ranges from 1:5 to 4:5.

12. The display panel of claim 11, wherein the second panel comprises the main support column and a third auxiliary support column adjacent to each other along a direction perpendicular to the third direction, and a third preset distance is provided between the center of the main support column and a center of the third auxiliary support column;
the third preset distance is larger than the second preset distance; and
the first preset distance ranges from 40 μm to 70 μm; the second preset distance ranges from 80 μm to 120 μm; and the third preset distance ranges from 130 μm to 170 μm.

13. The display panel of claim 1, wherein, along the first direction, two adjacent auxiliary support columns are separated by at least two adjacent pixel regions.

14. The display panel of claim 1, wherein a plurality of support columns in the second panel form a plurality of support column groups each comprising first support column sub-groups and second support column sub-groups alternately arranged along the first direction;

each of the first support column sub-groups comprises a plurality of support columns arranged along the third direction, and each of the plurality of support columns in the first support column sub-group satisfies: an imaginary connection line between a center of the support column and a center of a support column closest thereto extends along the third direction;

each of the second support column sub-groups comprises a plurality of support columns arranged along a sixth direction, and each of the plurality of support columns in the second support column sub-group satisfies: an imaginary connection line between a center of the support column and a center of a support column closest thereto extends along the sixth direction; and an included angle between the sixth direction and the third direction is not equal to 0°, and an included angle between the sixth direction and the first direction is equal to the included angle between the third direction and the first direction.

15. The display panel of claim 1, wherein the second panel comprises a first base substrate and a second base substrate opposite to each other, and further comprises a first electrode on the first base substrate, and a second electrode on a side of the second base substrate facing the first base substrate;

a first polarizer is on a side of the second panel away from the first panel, a second polarizer is on the side of the second panel facing the first panel, and a polarization direction of the first polarizer is the same as a polarization direction of the second polarizer;

a third polarizer is on a side of the first panel facing the second panel, a fourth polarizer is on a side of the first panel away from the second panel, and the third polarizer and the second polarizer are a same polarizer; and a polarization direction of the fourth polarizer is perpendicular to the polarization direction of the first polarizer.

16. A display device, comprising: a backlight module and the display panel of claim 1, wherein both the first panel and the second panel are on a light emission side of the backlight module.

* * * * *